US008051756B2

(12) United States Patent
Hashimoto et al.

(10) Patent No.: US 8,051,756 B2
(45) Date of Patent: Nov. 8, 2011

(54) BAND SAW BLADE AND CUTTING METHOD

(75) Inventors: Toshiyuki Hashimoto, Kanagawa (JP); Yuji Nagano, Kanagawa (JP); Susumu Tsujimoto, Kanagawa (JP)

(73) Assignee: Amada Company, Limited, Kanagawa (JP)

( * ) Notice: Subject to any disclaimer, the term of this patent is extended or adjusted under 35 U.S.C. 154(b) by 0 days.

(21) Appl. No.: 11/573,974

(22) PCT Filed: Aug. 18, 2005

(86) PCT No.: PCT/JP2005/015056
§ 371 (c)(1),
(2), (4) Date: Jun. 19, 2007

(87) PCT Pub. No.: WO2006/019129
PCT Pub. Date: Feb. 23, 2006

(65) Prior Publication Data
US 2008/0121079 A1    May 29, 2008

(30) Foreign Application Priority Data

Aug. 19, 2004  (JP) ................................ 2004-239864
Jul. 14, 2005  (JP) ................................ 2005-205905

(51) Int. Cl.
*B27B 33/14*   (2006.01)
*B27B 13/02*   (2006.01)
*B27B 33/02*   (2006.01)
*B23D 57/00*   (2006.01)

(52) U.S. Cl. ................... 83/13; 83/835; 83/848
(58) Field of Classification Search ............... 83/835, 83/848, 846, 850, 851, 855
See application file for complete search history.

(56) References Cited

U.S. PATENT DOCUMENTS

| 239,710 | A | * | 4/1881 | Boynton .................... 83/847 |
| 1,850,478 | A | * | 3/1932 | Schaefer .................... 83/847 |
| 2,152,906 | A | * | 4/1939 | Miller ....................... 83/825 |
| 3,220,446 | A | * | 11/1965 | Burkey ...................... 83/168 |
| 4,179,966 | A | * | 12/1979 | Ginnow et al. ............ 83/820 |
| 4,179,967 | A | * | 12/1979 | Clark ........................ 83/846 |
| 4,189,968 | A | * | 2/1980 | Miranti, Jr. ............... 83/816 |
| 4,195,543 | A | * | 4/1980 | Tapply et al. ............. 83/794 |
| 4,205,571 | A |   | 6/1980 | Bertini |
| 4,423,653 | A | * | 1/1984 | Howard ..................... 83/820 |
| 5,094,135 | A |   | 3/1992 | Nakahara et al. |
| 5,201,110 | A | * | 4/1993 | Bane ......................... 29/564.3 |

(Continued)

FOREIGN PATENT DOCUMENTS

JP      58-082620      5/1983

(Continued)

OTHER PUBLICATIONS

English Language Abstract of JP 58-082620.

(Continued)

*Primary Examiner* — Ghassem Alie
*Assistant Examiner* — Bharat C Patel
(74) *Attorney, Agent, or Firm* — Greenblum & Bernstein, P.L.C.

(57) ABSTRACT

Concave/convex portions are consecutively formed on a back of a band saw blade. The concave/convex portions include concave portions engageable with and disengageable from a backup guide of a band saw guide unit, and convex portions adjacent to the concave portions. A length of each of the concave/convex portions is configured to be equal to or smaller than four times a maximum pitch of a tooth top of each tooth.

6 Claims, 18 Drawing Sheets

U.S. PATENT DOCUMENTS

| | | | | |
|---|---|---|---|---|
| 6,003,422 A | * | 12/1999 | Holston | 83/661 |
| 6,276,248 B1 | * | 8/2001 | Cranna | 83/848 |
| 6,463,836 B1 | * | 10/2002 | Snodgrass, Jr. | 83/13 |
| 6,532,852 B1 | * | 3/2003 | Tsujimoto et al. | 83/661 |
| 7,036,415 B2 | * | 5/2006 | Tsujimoto | 83/661 |
| 7,520,202 B2 | * | 4/2009 | Wang | 83/820 |
| 2004/0035282 A1 | | 2/2004 | Tsujimoto | |
| 2006/0162526 A1 | | 7/2006 | Nagano et al. | |

FOREIGN PATENT DOCUMENTS

| | | |
|---|---|---|
| JP | 9-300131 | 11/1997 |
| JP | 2853767 | 11/1998 |

OTHER PUBLICATIONS

English Language Abstract of JP 9-300131.
English Language Abstract of JP 2-160413.

* cited by examiner (a)

(b)

(a)

(b)

(a)

(b)

(a)

(b)

(a)

(b)

(a)

(b)

(a)

(b)

(a)

(b)

(a)

(b)

BAND SAW BLADE AND CUTTING METHOD

TECHNICAL FIELD

The present invention relates to a band saw blade having many teeth and a cutting method for cutting a workpiece in a cutting region.

BACKGROUND ART

Conventionally, in general, a band saw machine is often used when a metal or wood workpiece is to be cut and the band saw machine includes a band saw blade as a cutting tool. The band saw blade includes many teeth including many unset teeth, many right set teeth set rightward, and many left set teeth set leftward.

Moreover, various contrivances have been employed, e.g., changes in a height difference among the teeth, amounts of set of the right set teeth and the left set teeth, and tooth top pitches have been designed so as to improve cutting performance (cuttability) with respect to a workpiece, or to reduce noise generated at the time of cutting a workpiece (cutting noise).

As a conventional technique relating to the present invention, Japanese Patent Brochure No. 2953767 2853767 is known.

Meanwhile, if a workpiece as a cutting target is larger, then a cutting length of the band saw blade becomes larger and a cutting resistance of the workpiece becomes higher. Due to this, the band saw blade causes a cutting course deviation, which disadvantageously shortens a service life of the band saw blade, increases the cutting noise, and degrades the work environment.

The present invention has been achieved to solve the above problems, and an object of the present invention is to provide a band saw blade and a cutting method capable of suppressing a cutting course deviation of the band saw blade, prolonging a service life of the band saw blade, and reducing cutting noise.

DISCLOSURE OF THE INVENTION

To attain the object, a first aspect of the present invention provides a band saw blade provided with a plurality of teeth and slidably supported by a band saw guide unit of a band saw machine, comprising: a plurality of concave and convex portions that are consecutively formed on a rear of the band saw blade, wherein each of concave portions is engageable with and disengageable from a backup guide of the band saw guide unit; each of convex portions is adjacent to each of the concave portions; and a length of each of the concave and convex portions is equal to or smaller than a fourfold of a maximum pitch of a tooth top of the teeth.

A second aspect of the present invention provides the band saw blade according to the first aspect, wherein the length of each of the concave and convex portions is equal to or smaller than a threefold of the maximum pitch of the tooth top of the teeth.

A third aspect of the present invention provides the band saw blade according to the first aspect or the second aspect, wherein each of the concave portions and each of the convex portions are classified into a plurality of types according to the length of each of the concave portions and each of the convex portions.

A fourth aspect of the present invention provides the band saw blade according to any one of the first aspect to the third aspect, wherein the concave portions among the plurality of concave portions and the plurality of convex portions are classified into a plurality of types according to a length of each of the concave portions.

A fifth aspect of the present invention provides the band saw blade according to any one of the first aspect to the fourth aspect, wherein the concave portions among the plurality of concave portions and the plurality of convex portions are classified into a plurality of types according to a depth of each of the concave portions.

According to the band saw blade of the first aspect and the fifth aspect, in a state where the band saw blade is supported by the guide unit, the band saw housing is relatively moved in a downward direction in which the band saw housing is approaching to a workpiece while causing the band saw blade to circularly travel. The workpiece can be thereby cut in the cutting region (a general cutting function).

Besides the general cutting function, the band saw blade is configured so that the many concave and convex portions are consecutively formed on the rear of the band saw blade, and so that the length of each concave and convex portions is equal to or smaller than the fourfold of the maximum pitch of the tooth top of the tooth. Due to this, by continuously engaging and disengaging the concave portions of the many concave and convex portions with and from the backup guide during cutting of the workpiece, the band saw blade can be forcedly vibrated in a band width direction in the cutting region. This enables alternately performing an operation for causing the teeth to bite into the workpiece and an operation for causing the teeth to scrape away chips at short intervals.

The reason for setting the length of the concave and convex portions to be equal to or smaller than the maximum pitch of the tooth top of the tooth is as follows. As substantiated by results of a first experiment to be described later, if the length of the concave and convex portion exceeds the fourfold of the maximum pitch of the tooth top of the tooth, the noise value (or particularly the noise value measured with characteristic C) increases.

A sixth aspect of the present invention provides a band saw blade provided with a plurality of teeth and slidably supported by a band saw guide unit of a band saw machine, comprising: a plurality of notches consecutively formed on a rear of the band saw blade, each of the plurality of notches being engageable with and disengageable from a backup guide of the band saw guide unit, wherein a length of each of the notches is equal to or smaller than a fourfold of a maximum pitch of a tooth top of the teeth.

According to the band saw blade of the sixth aspect, in a state where the band saw blade is supported by the guide unit, the band saw housing is relatively moved in a downward direction in which the band saw housing is closer to the workpiece while causing the band saw blade to circularly travel. The workpiece can be thereby cut in the cutting region (a general cutting function).

Besides the general cutting function, the band saw blade is configured so that the many notches are consecutively formed on the rear of the band saw blade, and so that the length of each notch is equal to or smaller than the fourfold of the maximum pitch of the tooth top of the tooth. Due to this, by continuously engaging and disengaging the many notches with and from the backup guide during cutting of the workpiece, the band saw blade can be forcedly vibrated in a band width direction in the cutting region. This enables alternately performing an operation for causing the teeth to bite into the workpiece and an operation for causing the teeth to scrape away chips at short intervals.

A seventh aspect of the present invention provides the band saw blade according to the sixth aspect, wherein the length of each of the notches is equal to or smaller than a threefold of the maximum pitch of the tooth top of each of the teeth.

An eighth aspect of the present invention provides a cutting method comprising the steps of: causing a band saw blade to continuously and circularly travel in a state where a band saw guide unit of a band saw machine supports the band saw blade; cutting a workpiece in a cutting region by relatively moving a band saw housing of the band saw machine in a cutting direction in which the band saw housing is closer to the workpiece; and forcedly vibrating the band saw blade in a band width direction in the cutting region.

According to the cutting method of the eighth aspect, because the band saw blade is forcedly vibrated in the band width direction in the cutting region, this enable alternately performing an operation for causing the teeth to bite into the workpiece and an operation for causing the teeth to scrape away chips at short intervals.

A ninth aspect of the present invention provides the cutting method according to the eighth aspect, wherein a plurality of concave and convex portions are consecutively formed on a rear of the band saw blade; each of the plurality of concave portions and each of the plurality of convex portions are arranged so as to be adjacent to one another; the vibration is generated in a manner such that the concave portion is continuously engaging with and disengaging from a backup guide provided in the band saw guide unit; and a length of each of the concave portions and each of the convex portions is equal to or smaller than a fourfold of a maximum pitch of a tooth top of the teeth.

According to the cutting method of the ninth aspect, because the band saw blade is forcedly vibrated in the band width direction in the cutting region by continuously engaging and disengaging the many notches with and from the backup guide, this enable alternately performing an operation for causing the teeth to bite into the workpiece and an operation for causing the teeth to scrape away chips at short intervals.

A tenth aspect of the present invention provides the cutting method according to the eighth aspect, wherein a plurality of notches are consecutively formed on a rear of the band saw blade; the vibration is generated in a manner such that each of the notches is continuously engaging with and disengaging from a backup guide provided in the band saw guide unit, and a length of a concave/convex portion of the notch is equal to or smaller than a fourfold of a maximum pitch of a tooth top of each of a plurality of teeth provided on the band saw blade.

According to the cutting method of the tenth aspect, because the band saw blade is forcedly vibrated in the band width direction in the cutting region by continuously engaging and disengaging the many notches with and from the backup guide, this enable alternately performing an operation for causing the teeth to bite into the workpiece and an operation for causing the teeth to scrape away chips at short intervals.

An eleventh aspect of the present invention provides the cutting method according to any one of the eighth aspect to the tenth aspect, wherein an amplitude of the vibration of the band saw blade is equal to or higher than 0.1 mm and equal to or lower than 0.5 mm.

The reason is as follows. As substantiated by a result of a second experiment to be described later, if the amplitude of the vibration of the band saw blade is lower than 0.1 mm, the cutting resistance of the workpiece cannot be made sufficiently low. If the amplitude of the vibration of the band saw blade is higher than 0.5 mm, the noise value (or particularly the noise value measured with characteristic C) increases.

A twelfth aspect of the present invention provides the cutting method according to any one of the eighth aspect to the eleventh aspect, wherein a frequency of the vibration of the band saw blade is equal to or higher than 5 Hz.

The reason is as follows. As substantiated by a result of a third experiment to be described later, if the frequency of the vibration of the band saw blade is lower than 5 Hz, the cutting resistance of the workpiece cannot be made sufficiently low.

As stated so far, according to the present invention, the operation for causing the teeth to bite into the workpiece and the operation for causing the teeth to scrape away the chips can be alternately performed at short intervals in the cutting region. It is, therefore, possible to reduce the cutting length of the band saw blade and reduce the cutting resistance of the workpiece irrespectively of a magnitude of the workpiece. Due to this, the cutting course deviation of the band saw blade is suppressed, the service life of the band saw blade is prolonged, the cutting noise is abated, and the work environment is improved.

BEST MODE FOR CARRYING OUT THE INVENTION

Figure 19:
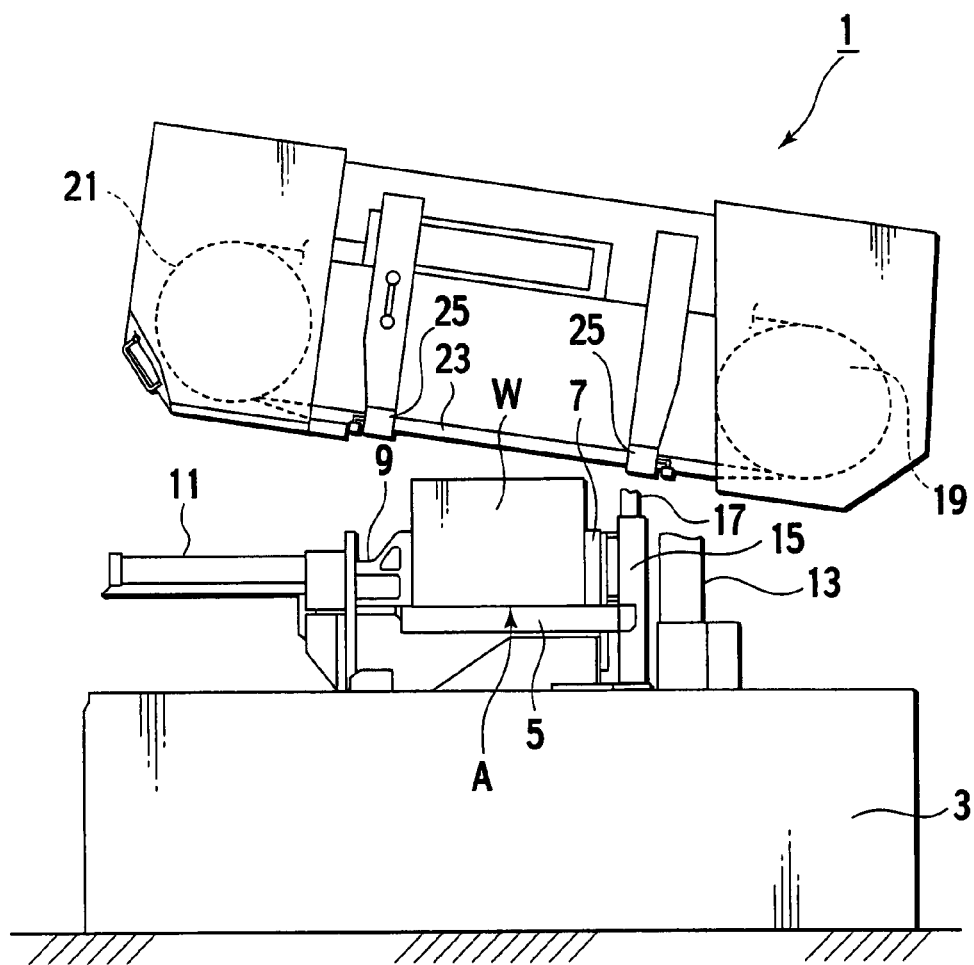
FIG. 19 is a front view of a horizontal band saw machine according to the embodiment.
Figure 20:
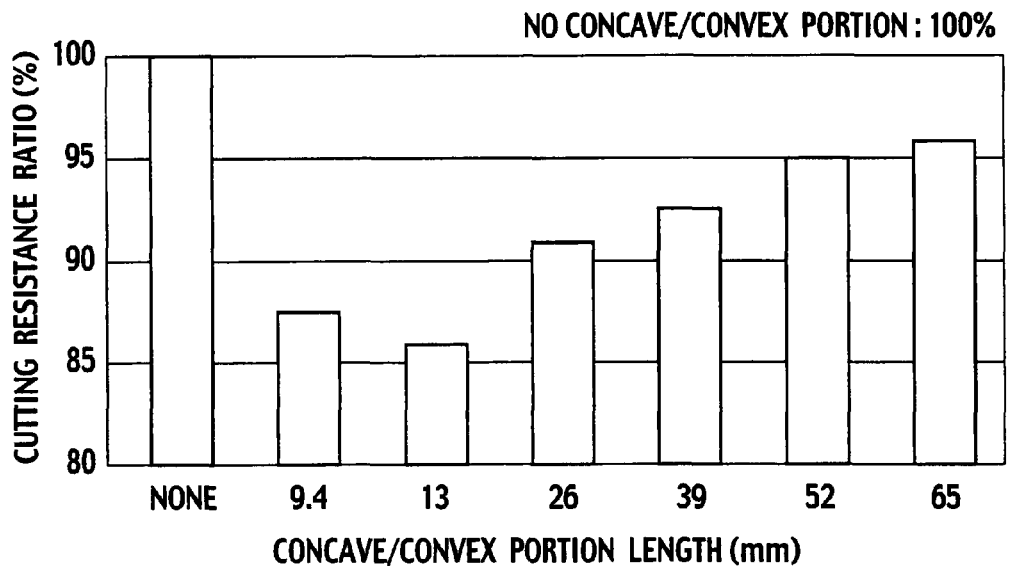
FIG. 20(a) is a chart showing a relation between a length of an concave and convex portions of a band saw blade and a cutting resistance ratio when an experiment is conducted while changing the length of the concave and convex portions under predetermined conditions.
FIG. 20(b) is a chart showing a relation between the length of the concave and convex portions of the band saw blade and a noise value when an experiment is conducted while changing the length of the concave and convex portion under predetermined conditions.
Figure 20:
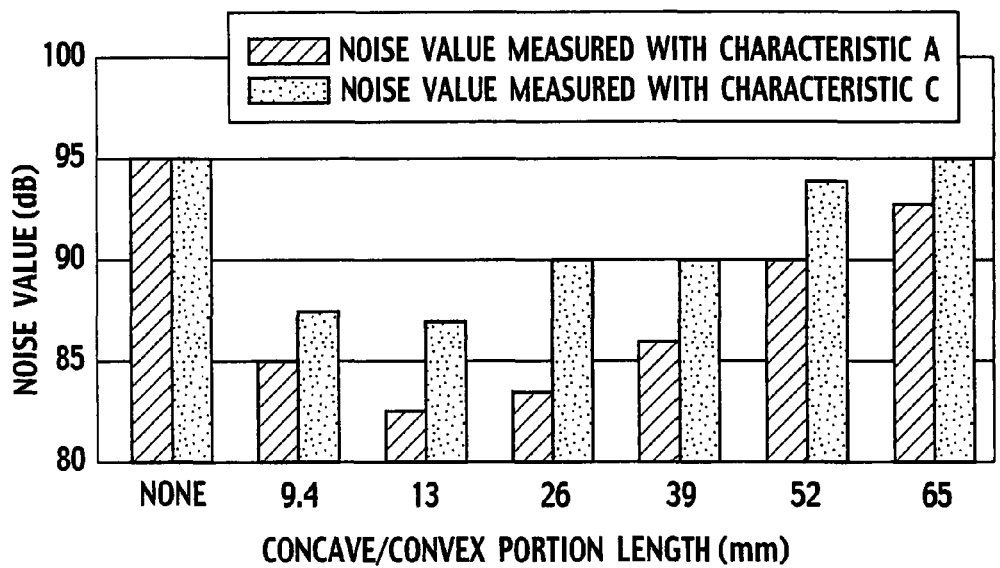
Figure 21:
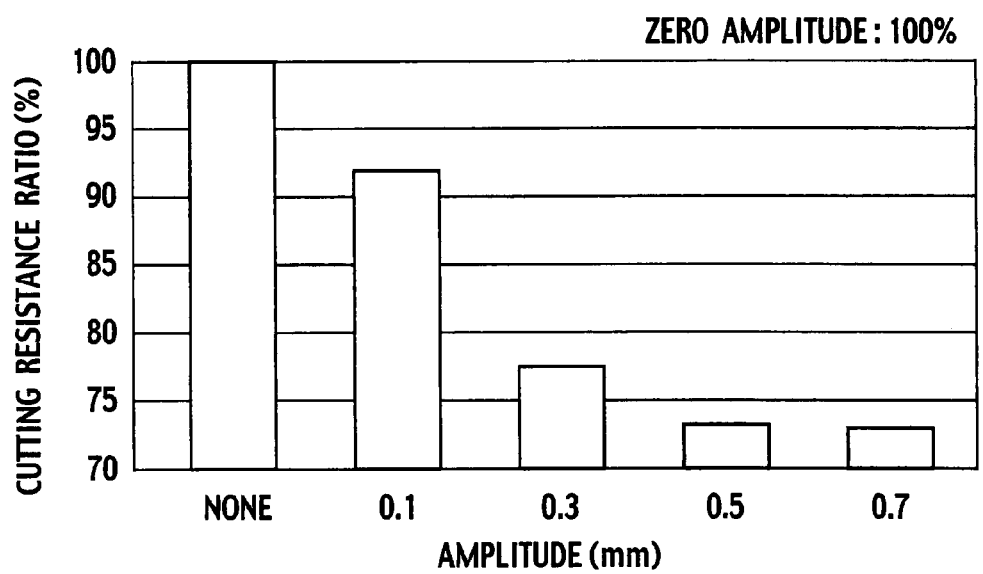
FIG. 21(a) is a chart showing a relation between an amplitude of vibration of a band saw blade and a cutting resistance ratio when an experiment is conducted while changing the amplitude of vibration under predetermined conditions.
FIG. 21(b) is a chart showing a relation between the amplitude of vibration of the band saw blade and a noise value when an experiment is conducted while changing the amplitude of vibration under predetermined conditions.
Figure 21:
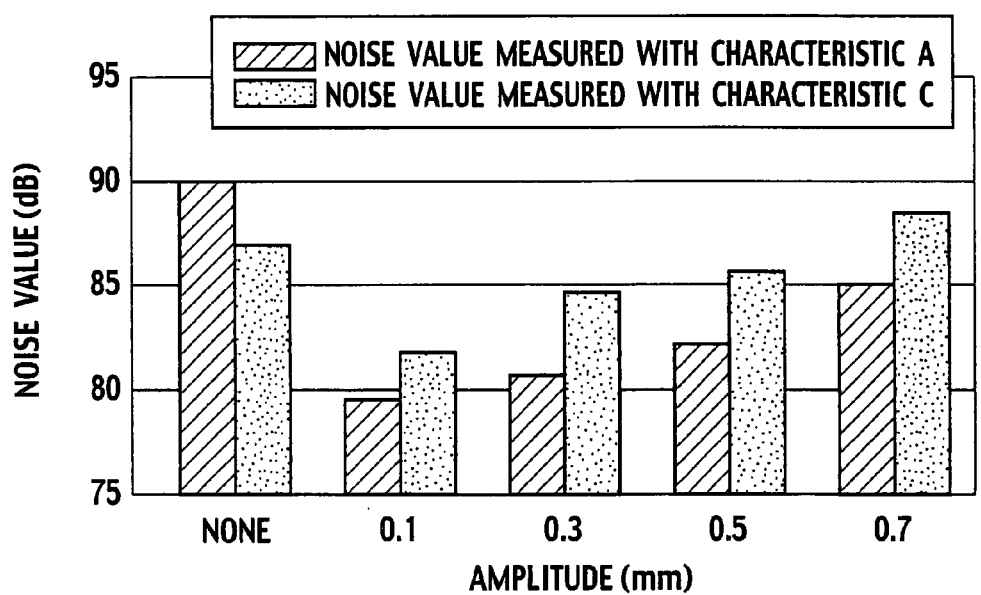

An embodiment of the present invention will be described below with reference to the drawings. A general configuration of a horizontal band saw machine according to an embodiment will be described first with reference to FIG. 19. FIG. 19 is a front view of the horizontal band saw machine according to the embodiment. In the following description, "horizontal" and "vertical" mean right and left and upward and downward, respectively relative to a direction of the drawings at the time of publication in a patent gazette.

As shown in FIG. 19, a horizontal band saw machine 1 according to the embodiment includes a box-type support frame 3, and a table 5 supporting a workpiece W is provided on the support frame 3. Furthermore, a fixed vice 7 and a movable vice 9, between which the workpiece W is held, are provided on the support frame 3 to be opposed to each other, and the movable vice 9 is movable in a horizontal direction in which the movable vice 9 is closer to or farther from the fixed vice 7 by actuation of a vice cylinder 11.

Moreover, a guide post 13 (a part of which is not shown in FIG. 19) stands on the support frame 3, and a band saw housing 15 is provided at the guide post 13 so as to be vertically movable. To vertically move the band saw housing 15, a housing cylinder 19 (a part of which is not shown in FIG. 19) that includes a vertically movable piston rod 17 stands on the support frame 3. A tip end of the piston rod 17 is coupled to an appropriate position of the band saw housing 15.

In the band saw housing 15, a main driving wheel 19 and a driven wheel 21 are rotatably provided, and the main driving wheel 19 is coupled to a traveling motor (not shown). An endless band saw blade 23 is wound from the main driving wheel 19 to the driven wheel 21. In other words, the endless band saw blade 23 is provided in the band saw housing 15 via the main driving wheel 19 and the driven wheel 21.

Moreover, a pair of band saw guide units 25 is provided in the band saw housing 15. The paired band saw guide units 25 supports the band saw blade 23 to enable the band saw blade 23 to travel so that a tooth top of a portion of the band saw blade 23 which portion enters a cutting region A is directed toward the workpiece W. Each band saw guide unit 25 includes a pair of guide rollers 27 supporting a body of the band saw blade 23 so as to hold the body between the guide rollers 27, and a backup roller 29 that is one of backup guides supporting a rear (back) of the band saw blade 23 (see FIG. 1). Various examples of the band saw blade 23 and the band saw guide units 25 will be described below.

Accordingly, the vice cylinder 11 is actuated, thereby moving the movable vie 9 left to be closer to the fixed vice 17 and holding the workpiece W supported on the table 5 between the movable vice 9 and the fixed vice 7. Next, the traveling motor is driven to rotate the main driving wheel 19 and the driven wheel 21, thereby causing the band saw blade 22 to circularly travel. Further, the housing cylinder 19 is actuated, thereby moving the band saw housing 15 in a downward direction (a cutting direction) in which the band saw housing 15 is closer to the workpiece W. It is thereby possible to cut the workpiece in the cutting region A.

A band saw blade according to a first example of the embodiment will be described with reference to FIGS. 1(a), 1(b), 2(a) to 2(d), 20, 21, and 22.

FIGS. 1(a) and 1(b) show the band saw blade according to the first example of the embodiment, and FIGS. 2(a) to 2(d) are pattern diagrams for explaining functions of the first example of the embodiment. FIG. 20(a) is a chart showing a relation between a length of a concave and convex portions of the band saw blade and a cutting resistance ratio when an experiment is conducted while changing the length of the concave and convex portions of the band saw blade under predetermined conditions. FIG. 20(b) is a chart showing a relation between the length of the concave and convex portions of the band saw blade and a noise value when an experiment is conducted while changing the length of the concave and convex portions of the band saw blade under predetermined conditions.

Figure 22:
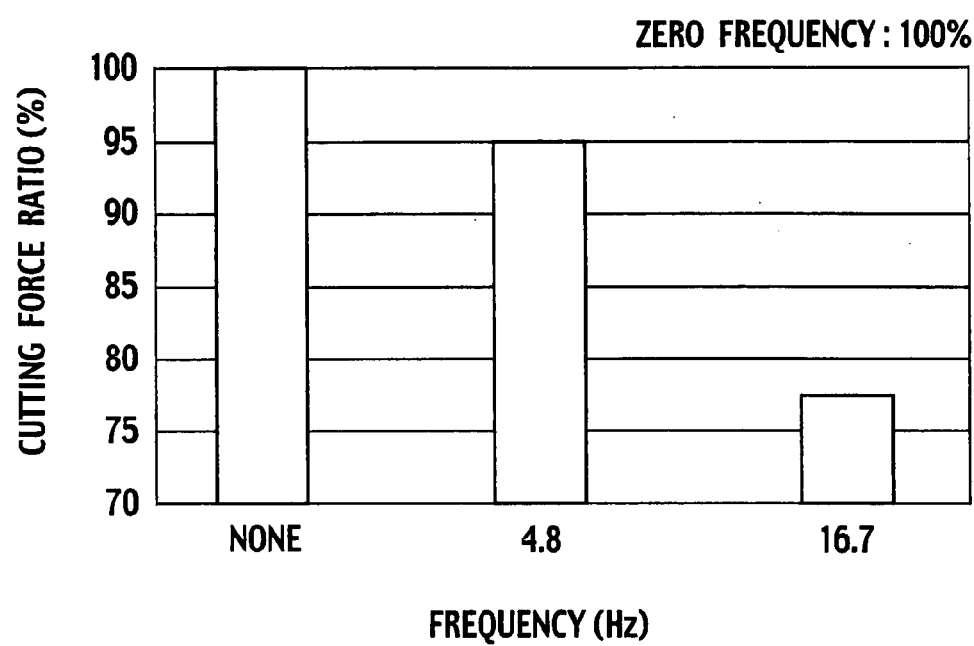
FIG. 22 is a chart showing a relation between a frequency of vibration of a band saw blade and a cutting resistance ratio when an experiment is conducted while changing the frequency under predetermined conditions.

FIG. 21(a) is a chart showing a relation between an amplitude of vibration of the band saw blade and the cutting resistance ratio when an experiment is conducted while changing the amplitude under predetermined conditions. FIG. 21(b) is a chart showing a relation between the amplitude of vibration of the band saw blade and the noise value when an experiment is conducted while changing the amplitude under predetermined conditions. FIG. 22 is a chart showing a relation between a frequency of vibration of a band saw blade and a cutting resistance ratio when an experiment is conducted while changing the frequency under predetermined conditions.

As shown in FIG. 1(a), a band saw blade 23i according to the first example is supported by the paired band saw guide units 25 to enable the band saw blade 23i to travel as stated above and includes many teeth 31. The many teeth 31 include many unset teeth, many left set teeth, and many right set teeth.

Many concave and convex (concave/convex) portions 33 are formed consecutively on the back of the band saw blade 23i, each of the concave/convex portion 33 includes a rectangular concave portion (with a depth B and a length L) 35 engageable with and disengageable from the backup roller 29, and a convex portion 37 adjacent to the concave portion 35.

The band saw blade 23i is configured so that a length P of each concave and convex portion 33 is equal to or larger than a minimum pitch Tmin of a tooth top of each tooth 31 and equal to or smaller than a fourfold of a maximum pitch Tmax. The reason for setting the length of the concave/convex portion 33 to be equal to or smaller than the maximum pitch Tmax of the tooth top of the tooth is as follows. As substantiated by results of a first experiment shown in FIGS. 20(a) and 20(b), if the length of the concave/convex portion 33 exceeds the fourfold (52 mm) of the maximum pitch Tmax of the tooth top of the tooth 31, the noise value (or particularly the noise value measured with characteristic C) increases.

The first experiment is conducted under conditions (that a diameter of the workpiece W is 400 nm, a saw width of the band saw blade 23i is 41 mm, a band thickness is 1.3 mm, a band length is 4995 mm, the minimum pitch Tmin of the tooth top is 9.4 mm, the maximum pitch Tmax of the tooth top is 13.0 mm, a diameter of the backup roller 29 is 34 mm, a traveling speed of the band saw blade 23$i$ is 55 m/min, and a cutting rate is 50 cm2/min).

Figure 1:
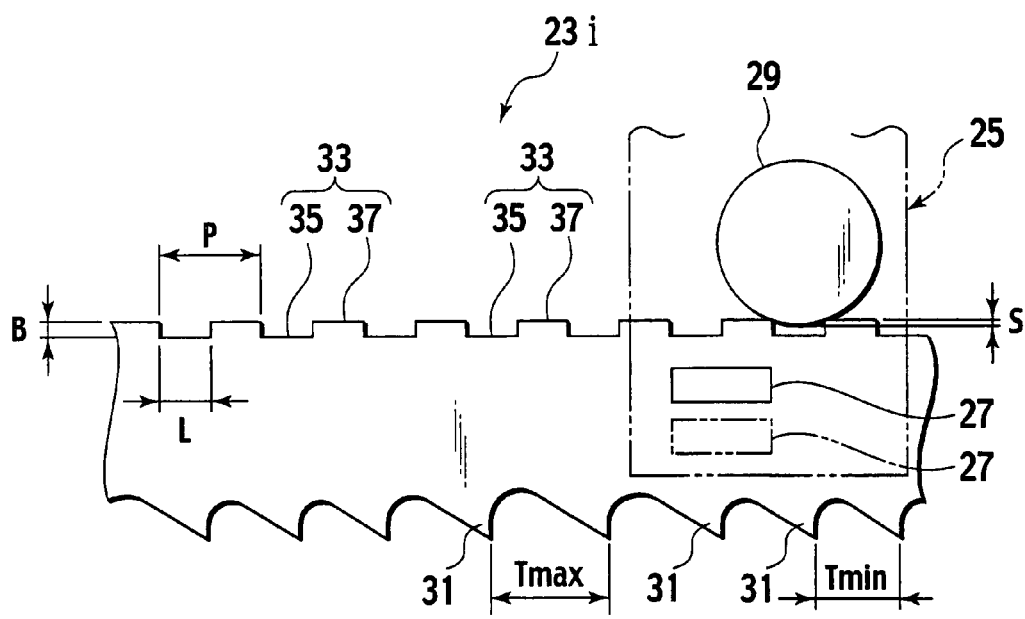
FIGS. 1(a) and 1(b) show a band saw blade according to a first example of an embodiment.
Figure 1:
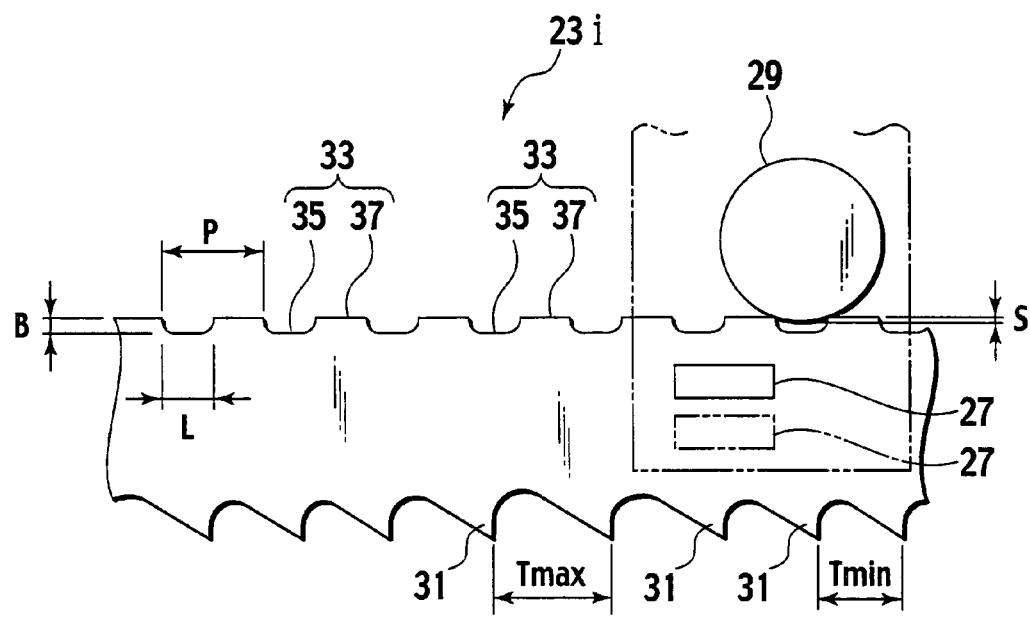

Moreover, the band saw blade 23$i$ is configured so as to form a gap between the backup roller 29 and a bottom of the concave portion 35 when the backup roller 29 is engaged with the concave portion 35. Further, as shown in FIG. 1($b$), to suppress stress concentration generated in corners of the bottom of the concave portion 35, it is desirable to form the corners of the bottom of the concave portion 35 into an R shape.

A cutting method according to the first example as well as functions of the cutting method will be described next.

In a state where the band saw blade 23$i$ is supported by the paired guide units 25, the band saw housing 15 is moved in the downward direction in which the band saw housing 15 is closer to the workpiece W while causing the band saw blade 23$i$ to circularly travel. The workpiece W can be thereby cut in the cutting region A (see FIG. 19).

Figure 2:
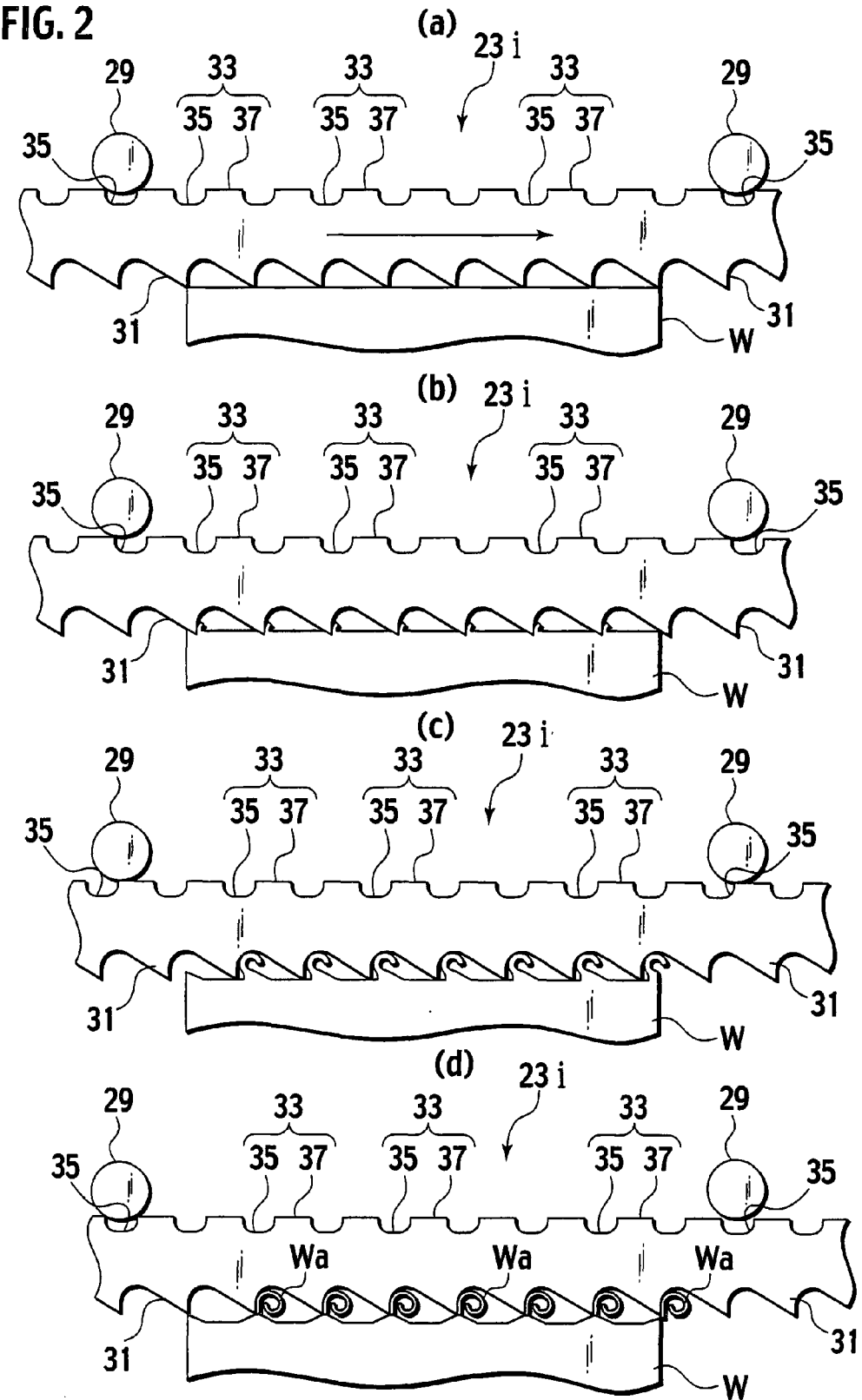
FIGS. 2(a) to 2(d) are pattern diagrams for explaining functions of the first example of the embodiment.

The band saw blade 23$i$ is configured so that many concave/convex portions 33 are consecutively formed on the back of the band saw blade 23$i$, and so that the length P of each concave/convex portion 33 is equal to or smaller than the fourfold of the maximum pitch Tmax of the tooth top of the tooth 31. Due to this, by continuously (consecutively) engaging and disengaging the concave portions 35 of the many concave/convex portion 33 with and from the backup roller 29, the band saw blade 23$i$ can be forcedly vibrated in a band width direction in the cutting region A. This enable alternately performing an operation for causing the teeth 31 to bite into the workpiece W as shown in FIGS. 2($a$) and 2($b$) and an operation for causing the teeth 31 to scrape away chips Wa as shown in FIGS. 2($c$) and 2($d$) at short intervals.

In this case, an immersion amount of the backup roller 29 with respect to the concave portion 35 when the backup roller 29 is engaged with the concave portion 35 is an amplitude S of the vibration of the band saw blade 23$i$, and the amplitude S is equal to or higher than 0.1 mm and equal to or lower than 0.5 mm. The reason is as follows. As substantiated by a result of a second experiment shown in FIGS. 21($a$) and 21($b$), if the amplitude of the vibration of the band saw blade 23$i$ is lower than 0.1 mm, the cutting resistance of the workpiece W cannot be made sufficiently low. If the amplitude of the vibration of the band saw blade 23$i$ is higher than 0.5 mm, the noise value (or particularly the noise value measured with characteristic C) increases. Note that the second experiment is conducted under the same predetermined conditions as those of the first experiment.

Moreover, a frequency Z (Z=(1000V/60)/P) of the vibration of the band saw blade 23$i$ specified by the length P (mm) of each concave/convex portion 33 and the traveling speed V (m/min) of the band saw blade 23$i$ is equal to or higher than 5 Hz. The reason is as follows. As substantiated by a result of a third experiment shown in FIG. 22, if the frequency of the vibration of the band saw blade 23$i$ is lower than 5 Hz, the cutting resistance of the workpiece W cannot be made sufficiently low. Note that the third experiment is conducted under the same predetermined conditions as those of the first experiment.

As stated so far, according to the first example, the operation for causing the teeth 31 to bite into the workpiece W and the operation for causing the teeth 31 to scrape away the chips Wa can be alternately performed at short intervals in the cutting region A. It is, therefore, possible to reduce the cutting length of the band saw blade 23$i$ and reduce the cutting resistance of the workpiece W irrespectively of a magnitude of the workpiece W. Due to this, the cutting course deviation of the band saw blade 23$i$ is suppressed, the service life of the band saw blade 23$i$ is prolonged, the cutting noise is abated, and the work environment is improved.

Figure 3:
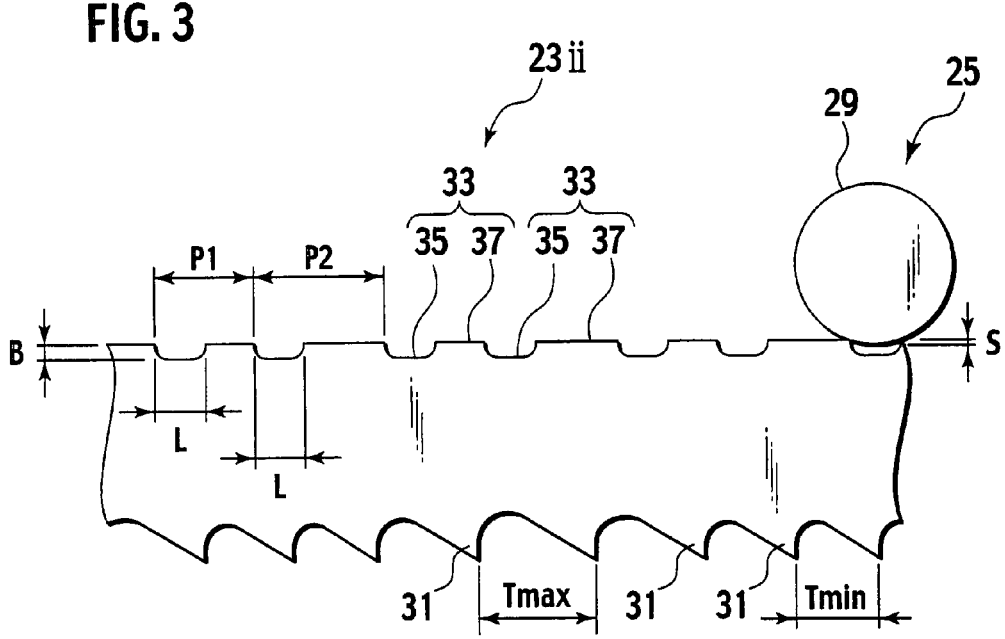
FIG. 3 shows a band saw blade according to a second example of the embodiment.

A second example of the embodiment will be described with reference to FIG. 3. FIG. 3 shows a band saw blade according to the second example of the embodiment. As shown in FIG. 3, a band saw blade 23$ii$ according to the second example is configured almost identical to the band saw blade 23$i$ according to the first example, and hence differences of a configuration of the band saw blade from that of the band saw blade 23$i$ will only be described.

Namely, the many concave/convex portions 33 are equal in length in the band saw blade 23$i$ according to the first example whereas the band saw blade 23$ii$ according to the second example is configured so that the many concave/convex portions 33 are classified into two types according to the length of each concave/convex portion 33. In other words, the many concave/convex portions 33 include concave/convex portions having different lengths P1 and P2.

Even if the band saw blade 23$ii$ according to the second example is employed, a cutting method similar to that according to the first example can be used. The second example exhibits the same functions and advantages as those of the first example. Particularly because the many concave/convex portions 33 include the concave/convex portion 33 having the different lengths P1 and P2, the cutting performance (cuttability) with respect to the workpiece can be further improved and the cutting noise can be further abated.

Note that the many concave/convex portions 33 can be classified into three or more types according to the length of each concave/convex portion 33.

Figure 4:
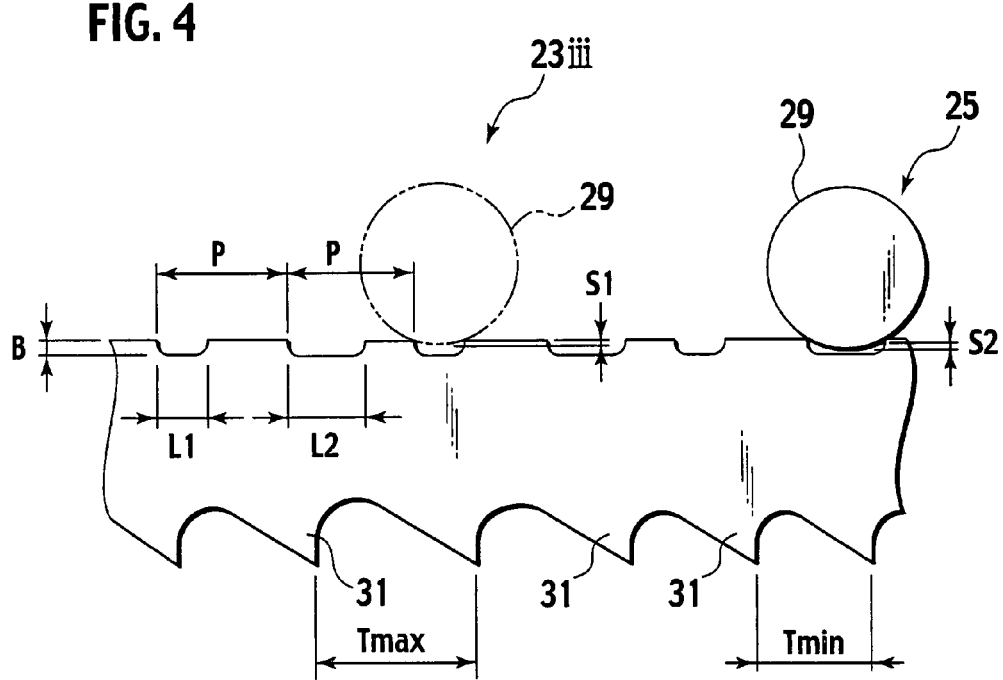
FIG. 4 shows a band saw blade according to a third example of the embodiment.

A third example of the embodiment will be described with reference to FIG. 4. FIG. 4 shows a band saw blade according to the third example of the embodiment. As shown in FIG. 4, a band saw blade 23$iii$ according to the third example is configured almost identical to the band saw blade 23$i$ according to the first example, and hence differences of a configuration of the band saw blade 23$iii$ from that of the band saw blade 23$i$ will only be described.

Namely, the many concave/convex portions 33 are equal in length in the band saw blade 23$i$ according to the first example whereas the band saw blade 23$iv$ according to the third example is configured so that the concave portions 35 of many concave/convex portions 33 are classified into two types according to the length of each concave portion 35. In other words, the concave portions 35 of the many concave/convex portions 33 include concave portions 35 having different lengths L1 and L2.

Even if the band saw blade 23$iii$ according to the third example is employed, a cutting method similar to that according to the first example can be used. The third example exhibits the same functions and advantages as those of the first example. Particularly because the concave portions 35 of the many concave/convex portions 33 include the concave portions 35 having the different lengths L1 and L2, the cutting performance (cuttability) with respect to the workpiece W can be further improved and the cutting noise can be further abated. In this case, the vibration of the band saw blade 23$iv$ has different amplitudes according to the different lengths of the concave portions 35.

Note that the concave portions 35 of the many concave/convex portions 33 can be classified into three or more types according to the length of each concave portion 35.

Figure 5:
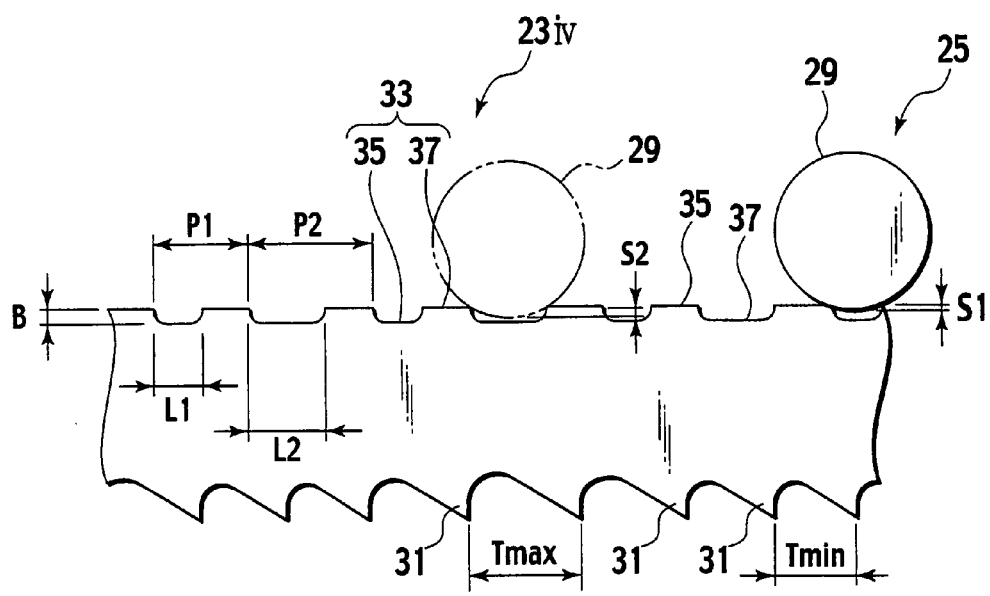
FIGS. 5(a) and 5(b) show a band saw blade according to a fourth example of the embodiment.
Figure 5:
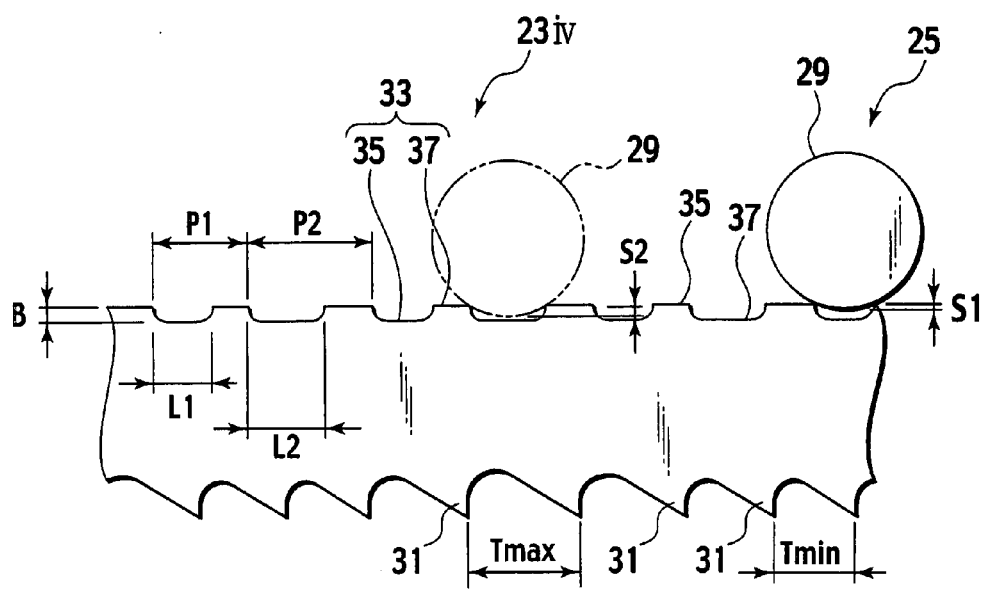

A fourth example of the embodiment will be described with reference to FIGS. 5($a$) and 5($b$). FIGS. 5($a$) and 5($b$) show a band saw blade according to the fourth example of the embodiment. As shown in FIGS. 5($a$) and 5($b$), a band saw blade 23*iv* according to the fourth example is configured almost identical to the band saw blade 23*i* according to the first example, and hence differences of a configuration of the band saw blade 23*iv* from that of the band saw blade 23*i* will only be described.

Namely, the many concave/convex portions 33 are equal in length in the band saw blade 23*i* according to the first example whereas the band saw blade 23*iv* according to the fourth example is configured so that the many concave/convex portions 33 are classified into two types according to the length of each concave portion 35. In other words, the many concave/convex portions 33 include concave/convex portion 33 having different lengths P1 and P2. As shown in FIG. 5(*a*), the convex portion 37 and the concave portion 37 adjacent to the convex portion 37 can be equal in length (P1−L1=P2−L2). As shown in FIG. 5(*b*), the convex portion 37 and another concave portion 37 adjacent to the convex portion 37 can be different in length (P1−L1≠P2−L2).

Moreover, the concave portions 35 of the many concave/convex portions 33 are equal in length in the band saw blade 23*i* according to the first example. The band saw blade 23*iv* according to the fourth example is, by contrast, configured so that the concave portions 35 of the many concave/convex portions 33 are classified into two types according to the length of each concave portion 35. In other words, the concave portions 35 of the many concave/convex portions 33 include concave portions 35 having different lengths L1 and L2.

Even if the band saw blade 23*iv* according to the fourth example is employed, a cutting method similar to that according to the first example can be used. The fourth example exhibits the same functions and advantages as those of the first example. Particularly because the many concave/convex portions include the concave/convex portions having the different lengths P1 and P2 and the concave portions 35 of the many concave/convex portions 33 include the concave portions 35 having the different lengths L1 and L2, the cutting performance (cuttability) with respect to the workpiece W can be further improved and the cutting noise can be further abated. In this case, the vibration of the band saw blade 23*iv* has different amplitudes according to the different lengths of the concave portions 35.

Note that the band saw blade 23*iv* can be configured so that the many concave/convex portions 33 are classified into three or more types according to the length of each concave/convex portion 33. Further, the concave portions 35 of the many concave/convex portion 33 can be classified into three or more groups according to the length of each concave portion 35.

Figure 6:
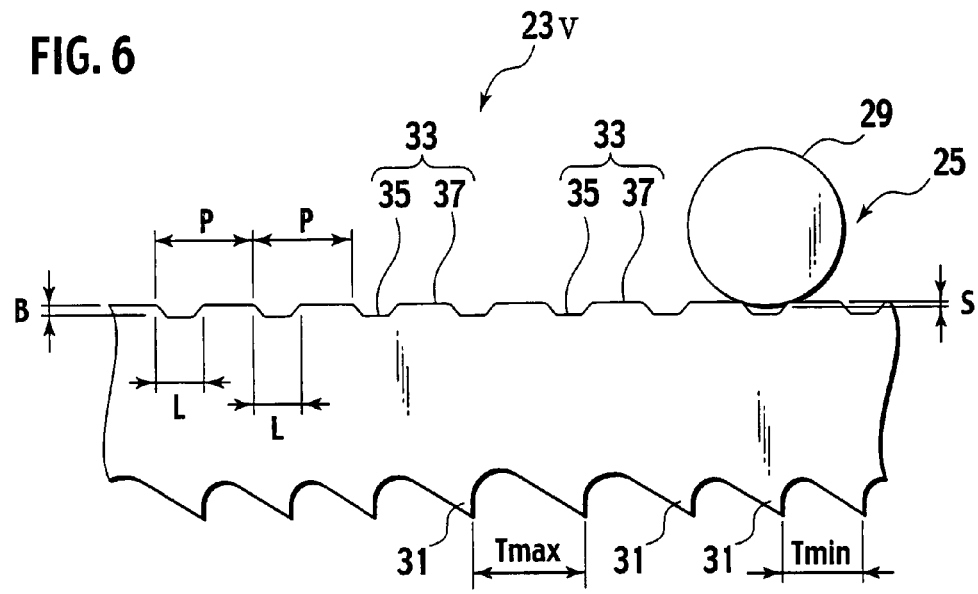
FIG. 6 shows a band saw blade according to a fifth example of the embodiment.

A fifth example of the embodiment will be described with reference to FIG. 6. FIG. 6 shows a band saw blade according to the fifth example of the embodiment. As shown in FIG. 6, a band saw blade 23*v* according to the fifth example is configured almost identical to the band saw blade 23*i* according to the first example, and hence differences of a configuration of the band saw blade 23*v* from that of the band saw blade 23*i* will only be described.

Namely, each concave portion 35 is rectangular in the band saw blade 23*i* according to the first example whereas each concave portion 35 is trapezoidal in the band saw blade 23*v* according to the fifth example. Even if the band saw blade 23*v* according to the fifth example is employed, a cutting method similar to that according to the first example can be used. The fifth example exhibits the same functions and advantages as those of the first example.

Note that the band saw blade 23*v* can be configured so that the many concave/convex portions 33 are classified into two or more types according to the length of each concave/convex portion 33. Further, the concave portions 35 of the many concave/convex portions 33 can be classified into two or more groups according to the length of each concave portion 35.

Figure 7:
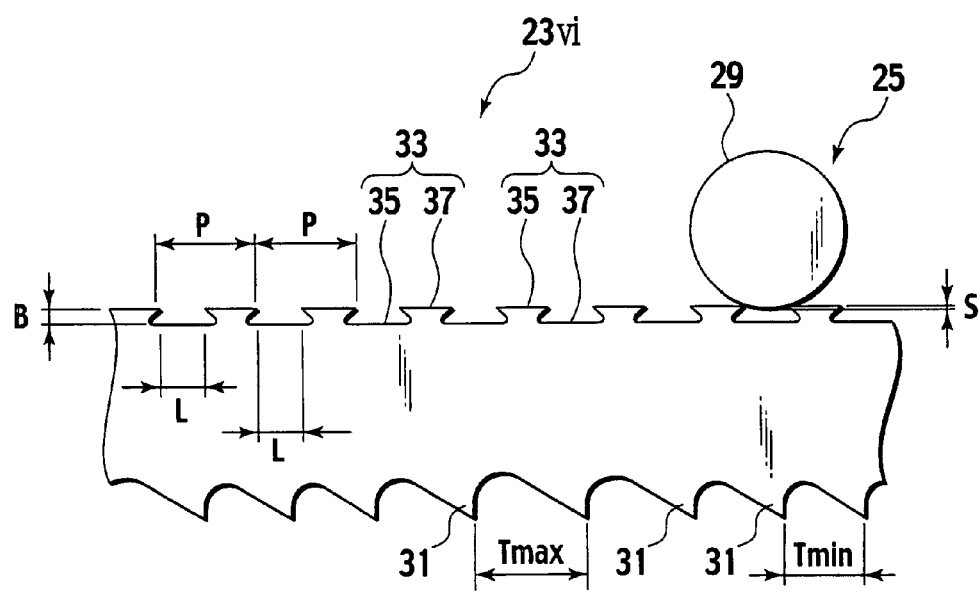
FIG. 7 shows a band saw blade according to a sixth example of the embodiment.

A sixth example of the embodiment will be described with reference to FIG. 7. FIG. 7 shows a band saw blade according to the sixth example of the embodiment. As shown in FIG. 7, a band saw blade 23*vi* according to the sixth example is configured almost identical to the band saw blade 23*i* according to the first example, and hence differences of a configuration of the band saw blade 23*vi* from that of the band saw blade 23*i* will only be described.

Namely, each concave portion 35 is rectangular in the band saw blade 23*i* according to the first example whereas a shape of each concave portion 35 is a dovetail groove in the band saw blade 23*vi* according to the fifth example.

Even if the band saw blade 23*vi* according to the sixth example is employed, a cutting method similar to that according to the first example can be used. The sixth example exhibits the same functions and advantages as those of the first example.

Note that the band saw blade 23*vi* can be configured so that the many concave/convex portions 33 are classified into two or more types according to the length of each concave/convex portion 33. Further, the concave portions 35 of the many concave/convex portions 33 can be classified into two or more groups according to the length of each concave portion 35.

Figure 8:
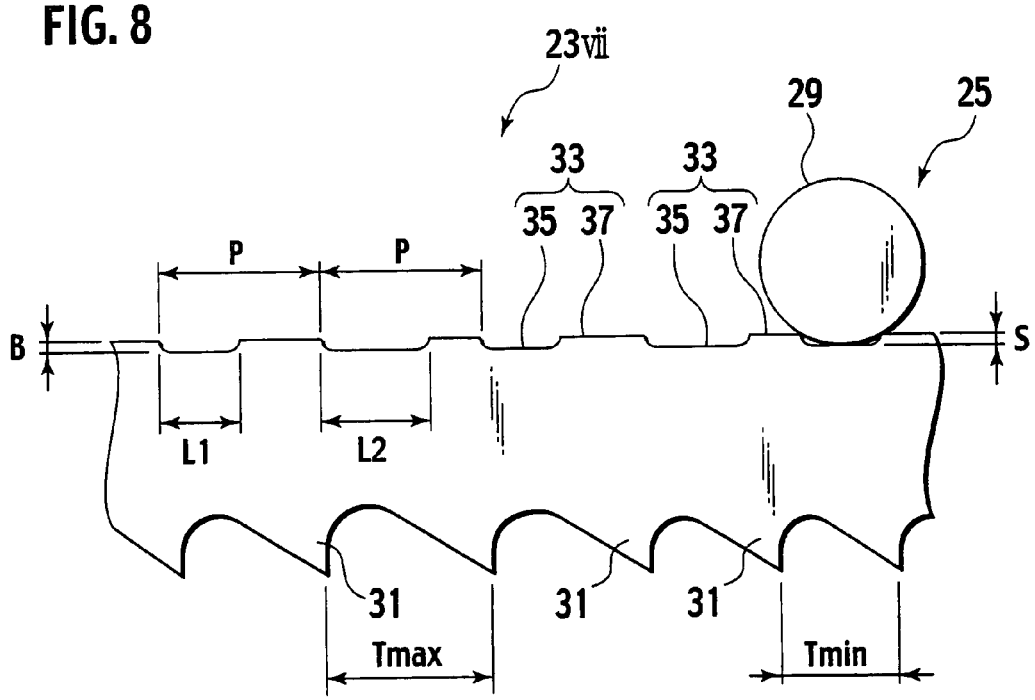
FIG. 8 shows a band saw blade according to a seventh example of the embodiment.

A seventh example of the embodiment will be described with reference to FIG. 8. FIG. 8 shows a band saw blade according to the seventh example of the embodiment. As shown in FIG. 8, a band saw blade 23*vii* according to the seventh example is configured almost identical to the band saw blade 23*iv* according to the fourth example, and hence differences of a configuration of the band saw blade 23*vii* from that of the band saw blade 23*iv* will only be described.

Namely, the band saw blade 23*iv* according to the fourth example is configured so that a gap is formed between the backup roller 29 and the bottom of the concave portion 35 when the backup roller 29 is engaged with the concave portion 35. The band saw blade 23*vii* according to the seventh example is, by contrast, configured so that the backup roller 29 contacts with the bottom of the concave portion 35 when the backup roller 29 is engaged with the concave portion 35. By so configuring, the number of contact portions of the band saw blade 23*vii* with the backup roller 29 increases, and the backup roller 29 can receive a cutting thrust force in a dispersed manner.

Even if the band saw blade 23*vii* according to the seventh example is employed, a cutting method similar to that according to the fourth example (or first example) can be used. The seventh example exhibits the same functions and advantages as those of the first example (or first example). In this case, the immersion amount of the backup roller 29 with respect to the concave portion 35 when the backup roller 29 is engaged with the concave portion 35 is equal to a depth B of each of the concave portions 35, and the depth B of the concave portion 35 corresponds to the amplitude S of the vibration of the band saw blade 23*vii*.

Figure 9:
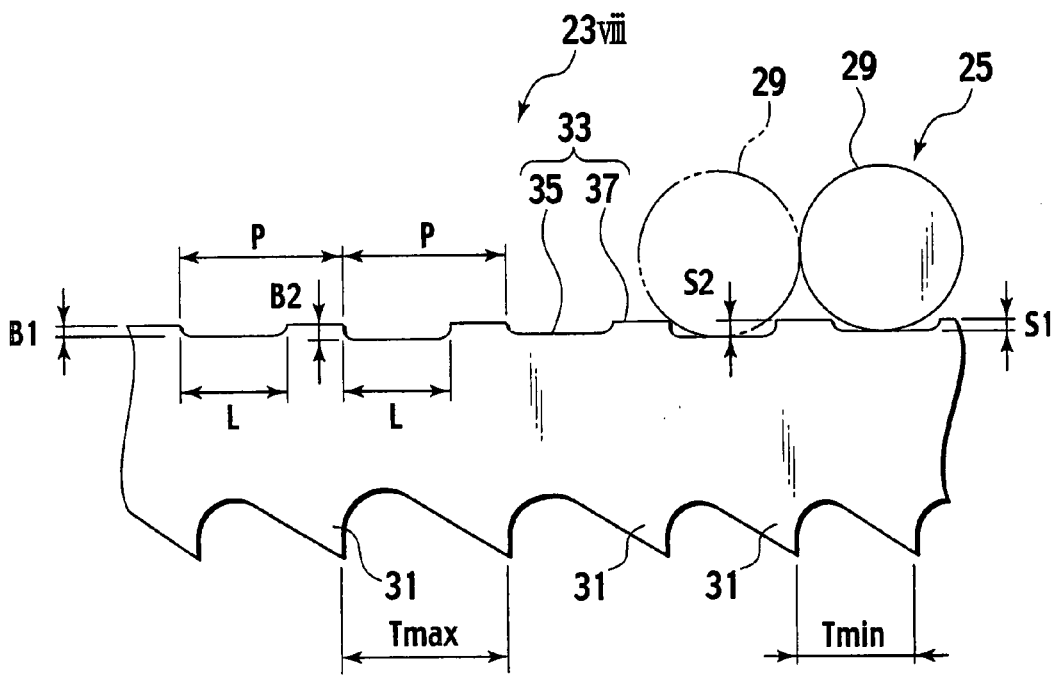
FIG. 9 shows a band saw blade according to an eighth example of the embodiment.

An eighth example of the embodiment will be described with reference to FIG. 9. FIG. 9 shows a band saw blade according to the eighth example of the embodiment. As shown in FIG. 9, a band saw blade 23*viii* according to the eighth example is configured almost identical to the band saw blade 23*vii* according to the seventh example, and hence differences of a configuration of the band saw blade 23*viii* from that of the band saw blade 23*vii* will only be described.

Namely, the number of types of the concave portions 35 of the many concave/convex portions 33 is one in the band saw blade 23vii according to the seventh example whereas the band saw blade 23viii according to the eighth example is configured so that the concave portions 35 of many concave/convex portions 33 are classified into two types according to the depth of each concave portion 35. In other words, the concave portions 35 of the many concave/convex portions 33 include concave portions 35 having different depths B1 and B2.

Even if the band saw blade 23viii according to the eighth example is employed, a cutting method similar to that according to the seventh example (or first example) can be used. The eighth example exhibits the same functions and advantages as those of the eighth example (or first example). Particularly because the concave portions 35 of the many concave/convex portions 33 include the concave portions 35 having the different depths B1 and B2, the cutting performance (cuttability) with respect to the workpiece W can be further improved and the cutting noise can be further abated. In this case, the vibration of the band saw blade 23xi has different amplitudes S1(=B1) and S2(=B2) according to the different depths of the concave portions 35.

Note that the concave portions 35 of the many concave/convex portions 33 can be classified into three or more types according to the depth of each concave portion 35. Further, the many concave/convex portions 33 can be classified into two or more types according to the length of each concave/convex portion 33.

Figure 10:
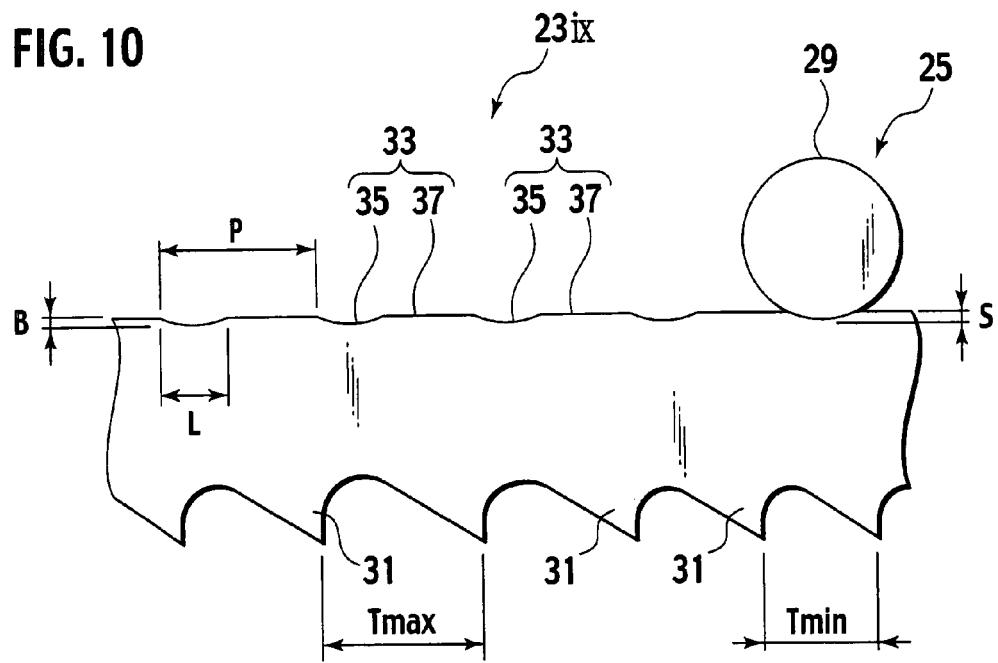
FIG. 10 shows a band saw blade according to a ninth example of the embodiment.

A ninth example of the embodiment will be described with reference to FIG. 10. FIG. 10 shows a band saw blade according to the ninth example of the embodiment. As shown in FIG. 10, a band saw blade 23ix according to the ninth example is configured almost identical to the band saw blade 23vii according to the seventh example, and hence differences of a configuration of the band saw blade 23ix from that of the band saw blade 23vii will only be described.

Namely, each of the concave portions 35 is rectangular in the band saw blade 23vii according to the seventh example. By contrast, the shape of each of the concave portions 35 is a circular arc having the same radius of curvature as that of the backup roller 29 in the band saw blade 23ix according to the ninth example. By so configuring, in the band saw blade 23ix according to the ninth example, the backup roller 29 has a plane contact with the concave portion 35, and the backup roller 29 can receive a cutting thrust force in a dispersed manner.

Even if the band saw blade 23ix according to the ninth example is employed, a cutting method similar to that according to the seventh example (or first example) can be used. The ninth example exhibits the same functions and advantages as those of the seventh example (or first example).

Note that the concave portions 35 of the many concave/convex portions 33 can be classified into two or more types according to the depth of each concave portion 35. Further, the many concave/convex portions 33 can be classified into two or more types according to the depth of each concave/convex portion 33.

Figure 11:
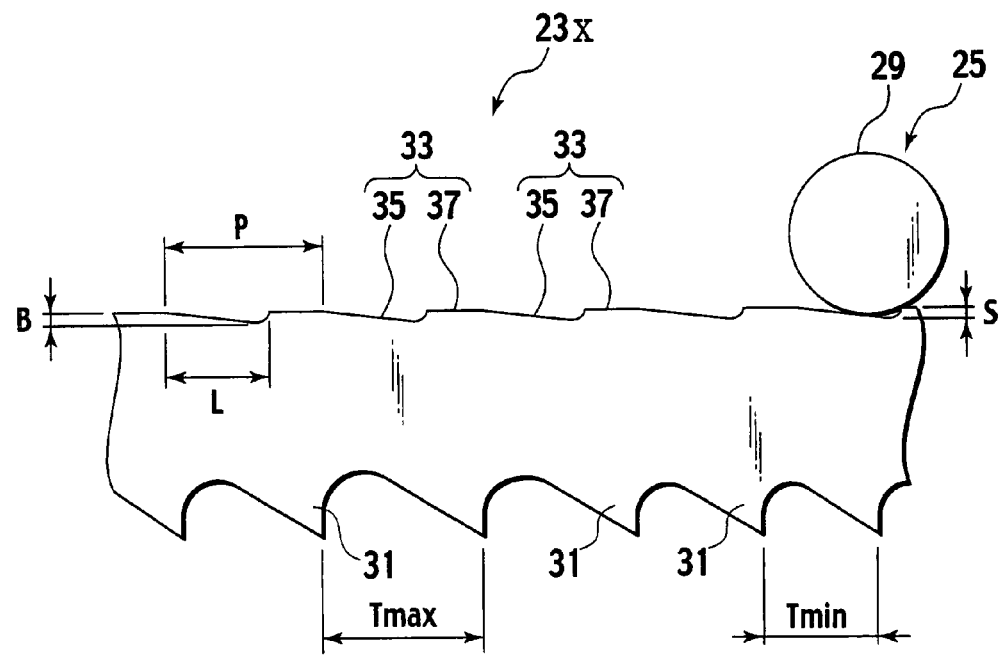
FIG. 11 shows a band saw blade according to a tenth example of the embodiment.

A tenth example of the embodiment will be described with reference to FIG. 11. FIG. 11 shows a band saw blade according to the tenth example of the embodiment. As shown in FIG. 11, a band saw blade 23x according to the tenth example is configured almost identical to the band saw blade 23vii according to the seventh example, and hence differences of a configuration of the band saw blade 23x from that of the band saw blade 23vii will only be described.

Namely, the band saw blade 23vii according to the seventh example is configured so that the bottom of each concave portion 35 is flat whereas the band saw blade 23x according to the tenth example is configured so that the bottom of each concave portion 35 is inclined.

Even if the band saw blade 23x according to the tenth example is employed, a cutting method similar to that according to the seventh example (or first example) can be used. The tenth example exhibits the same functions and advantages as those of the seventh example (or first example). Because of the configuration so that the bottom of each concave portion 35 is inclined, the vibration of the band saw blade 23x is a smooth motion and chipping can be reduced at the tooth top of each tooth 31.

Figure 12:
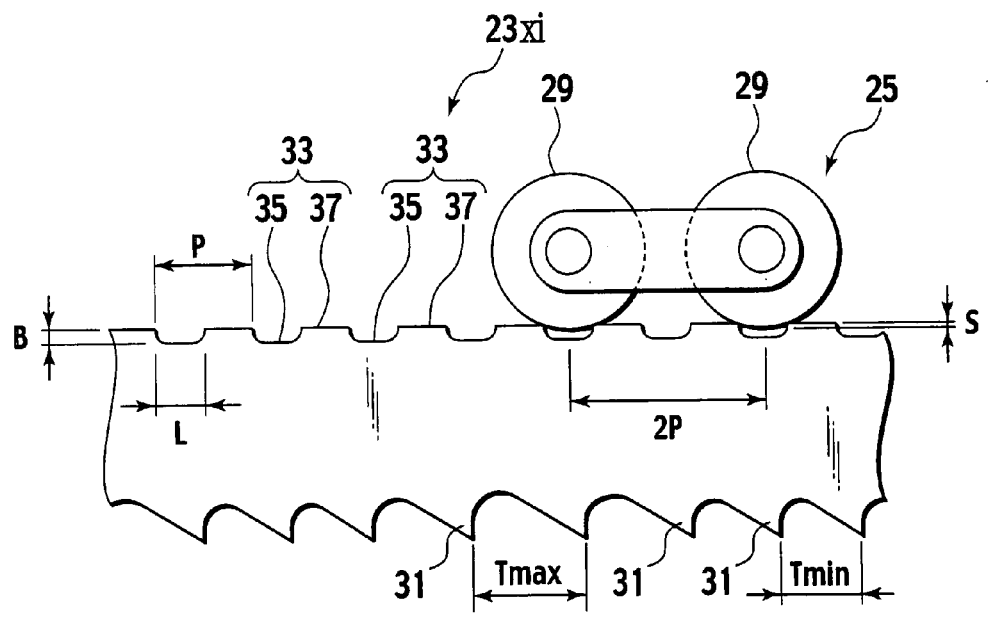
FIGS. 12(a) and 12(b) show a band saw blade according to an eleventh example of the embodiment.
Figure 12:
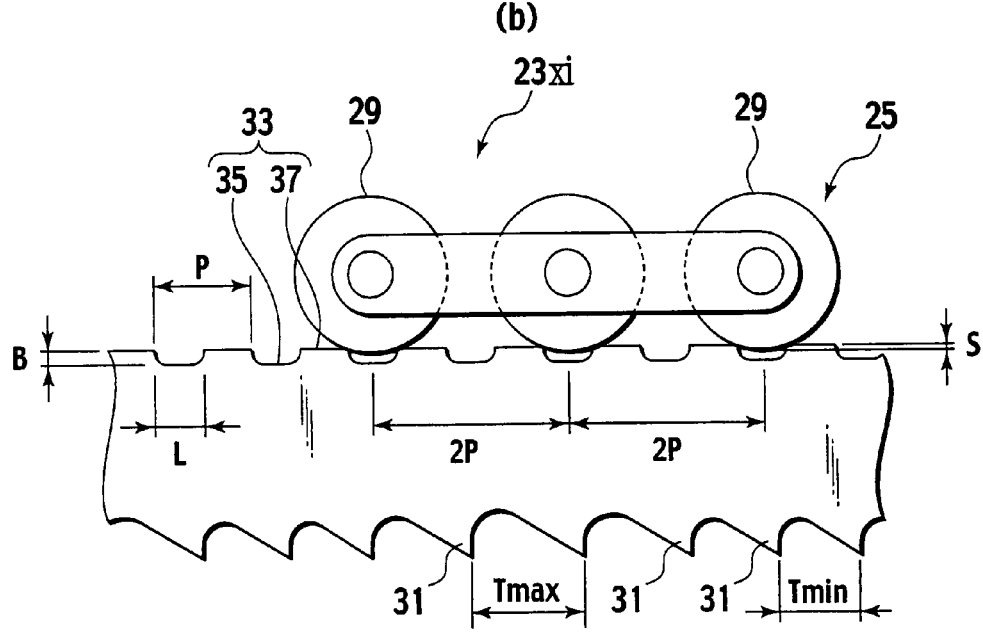

An eleventh example of the embodiment will be described with reference to FIGS. 12(a) and 12(b). FIGS. 12(a) and 12(b) show a band saw blade according to the eleventh example of the embodiment. As shown in FIGS. 12(a) and 12(b), a band saw blade 23xi according to the eleventh example is configured almost identical to the band saw blade 23i according to the first example, and hence differences of the eleventh example from the first example will only be described.

Namely, each of the band saw guide units 25 according to the first example includes one backup roller 29 whereas each of the band saw guide units 25 according to the eleventh example includes two or three backup rollers 29. In this case, a center distance between the two or three backup rollers 29 divided by the length P of each concave/convex portion 33 gives two (or an integer equal to or greater than three). By so configuring, the two backup rollers 29 can receive a high cutting thrust force in a dispersed manner.

Even if the band saw blade 23xi according to the eleventh example is employed, a cutting method similar to that according to the first example can be used. The eleventh example exhibits the same functions and advantages as those of the first example.

Figure 13:
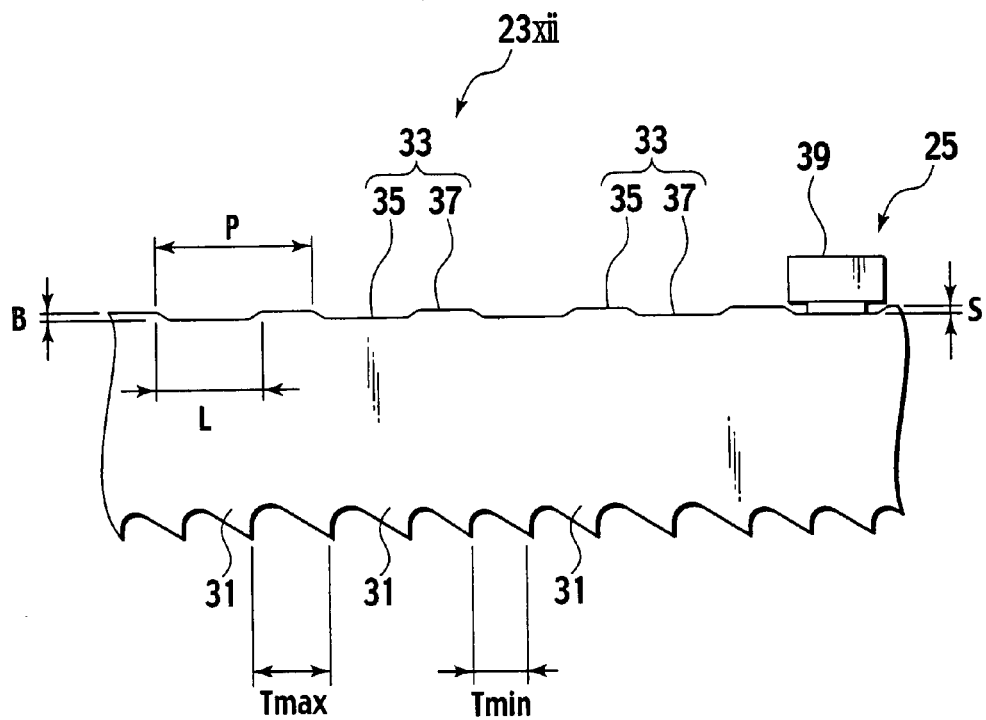
FIGS. 13(a) and 13(b) show a band saw blade according to a twelfth example of the embodiment.
Figure 13:
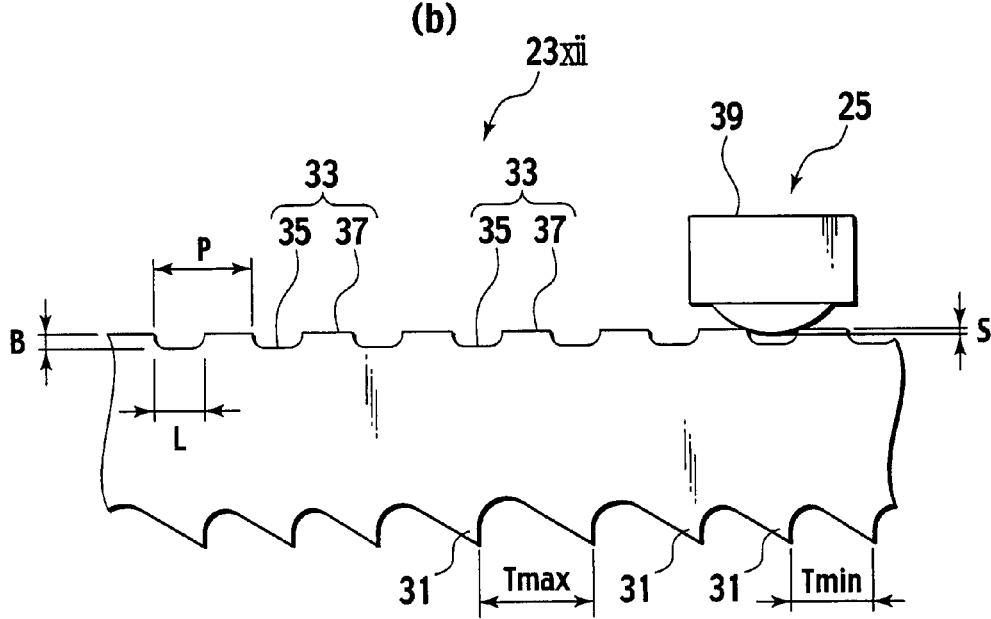

A twelfth example of the embodiment will be described with reference to FIGS. 13(a) and 13(b). FIGS. 13(a) and 13(b) show a band saw blade according to the twelfth example of the embodiment. As shown in FIGS. 13(a) and 13(b), a band saw blade 23xii according to the twelfth example is configured almost identical to the band saw blade 23i according to the first example, and hence differences of the twelfth example from the first example will only be described.

Namely, each of the band saw guide units 25 according to the first example includes the backup roller 29 whereas each of the band saw guide units 25 according to the twelfth example includes a backup chip 39 that is another backup guide.

Even if the band saw blade 23xii according to the twelfth example is employed, a cutting method similar to that according to the first example can be used. The twelfth example exhibits the same functions and advantages as those of the first example.

Figure 14:
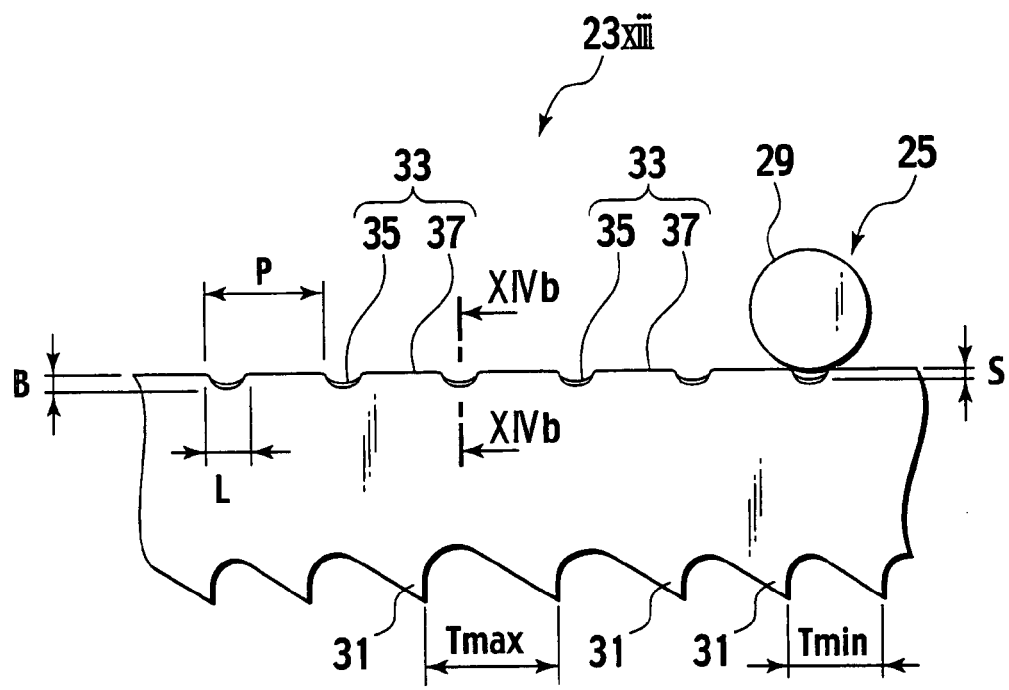
FIG. 14(a) shows a band saw blade according to a thirteenth example of the embodiment.
FIG. 14(b) is a view taken along a line XIVb-XIVb shown in FIG. 14(a)
Figure 14:
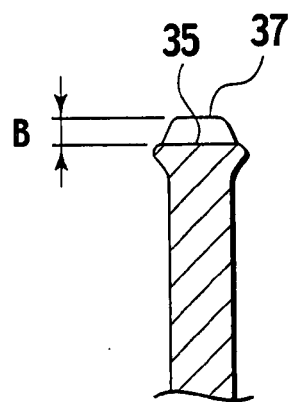

A thirteenth example of the embodiment will be described with reference to FIGS. 14(a) and 14(b). FIG. 14(a) shows a band saw blade according to the thirteenth example of the embodiment, and FIG. 14(b) is a view taken along a line XIVb-XIVb shown in FIG. 14(a). As shown in FIGS. 14(a) and 14(b), a band saw blade 23xiii according to the thirteenth example is configured almost identical to the band saw blade 23i according to the first example, and hence differences of a configuration of the band saw blade 23xiii from that of the band saw blade 23i will only be described.

Namely, each concave portion 35 is formed by cutting or grinding in the band saw blade 23i according to the first example whereas each concave portion 35 is formed by rolling in the band saw blade 23xiii according to the thirteenth example.

Even if the band saw blade 23xiii according to the thirteenth example is employed, a cutting method similar to that according to the first example can be used. The thirteenth example exhibits the same functions and advantages as those of the first example.

Figure 15:
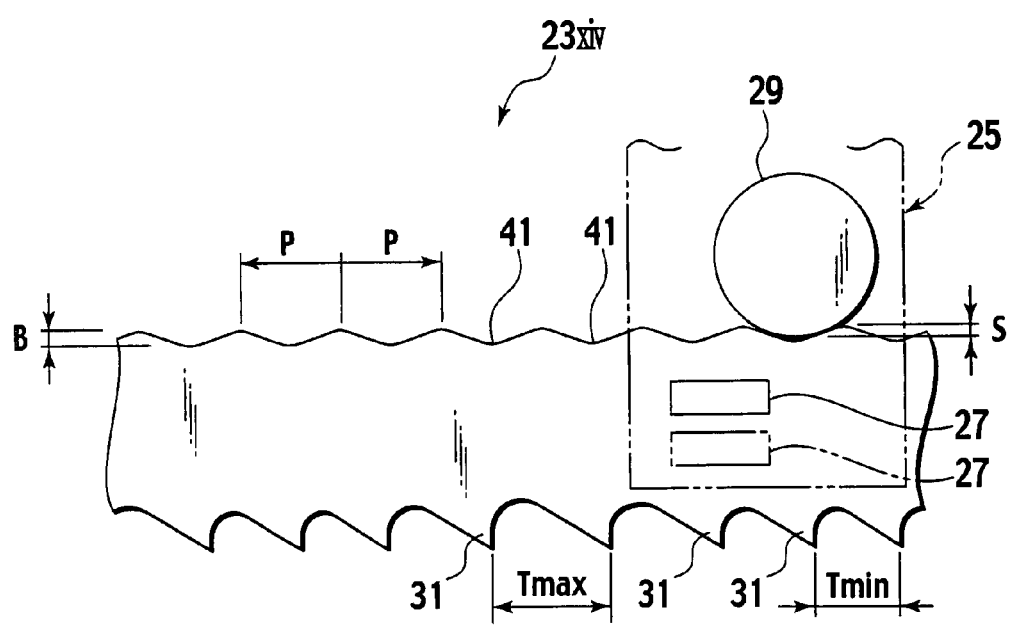
FIG. 15 shows a band saw blade according to a fourteenth example of the embodiment.

A band saw blade according to a fourteenth example of the embodiment will be described with reference to FIGS. 15 and 16(a) to 16(d). FIG. 15 shows the band saw blade according to the fourteenth example of the embodiment. FIGS. 16(a) to 16(d) are pattern diagrams for explaining functions of the fourteenth example. As shown in FIG. 15, a band saw blade 23xiv according to the fourteenth example is supported by the paired band saw guide units 25 so that the band saw blade 23xiv is able to travel similarly to the band saw blade 23i according to the first example, and the band saw blade 23xiv includes many teeth 31.

Many triangular notches (with a depth B) 41 engageable with and disengageable from the backup roller 29 are consecutively formed on the back of the band saw blade 23xiv.

Furthermore, the band saw blade 23xiv is configured so that a length P of each notch 41 is equal to or larger than the minimum pitch Tmax of the tooth top of each tooth 31 and equal to or smaller than the fourfold of the minimum pitch Tmin. The reason for setting the length of the notch 4 to be equal to or smaller than the fourfold of the maximum pitch Tmax of the tooth top of the tooth is as follows. If the length of the notch 41 exceeds the fourfold of the maximum pitch Tmax of the tooth top of the tooth 31, the noise value (or particularly that measured with characteristic C) increases (which is already confirmed by conducting an experiment similar to the first experiment).

Moreover, the band saw blade 23xiv is configured so that a gap is formed between the backup roller 29 and the bottom of the notch 41 when the backup roller 29 is engaged with the notch 41.

A cutting method according to the fourteenth example as well as functions of the cutting method will be described next. In a state where the band saw blade 23xiv is supported by the paired guide units 25, the band saw housing 15 is moved in a downward direction in which the band saw housing 15 is closer to the workpiece W while causing the band saw blade 23xiv to circularly travel. The workpiece W can be thereby cut in the cutting region A (see FIG. 19).

Figure 16:
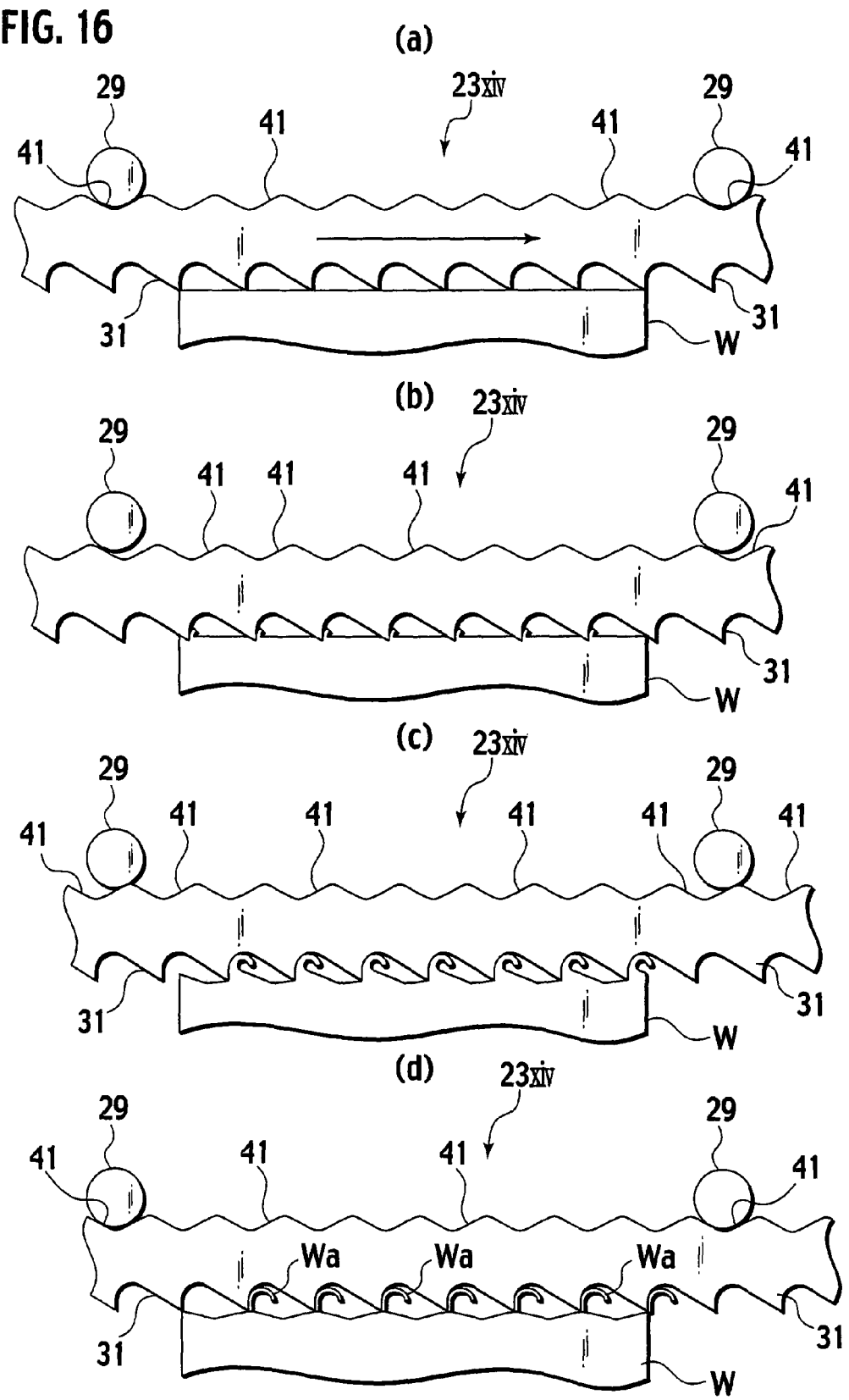
FIGS. 16(a) to 16(d) are pattern diagrams for explaining functions of the fourteenth example of the embodiment.

The band saw blade 23xiv is configured so that many notches 41 are consecutively formed on the back of the band saw blade 23xiv, and so that the length P of each notch 41 is equal to or smaller than the fourfold of the maximum pitch Tmax of the tooth top of the tooth 31. Due to this, by continuously engaging and disengaging the many notches 41 with and from the backup roller 29, the band saw blade 23xiv can be forcedly vibrated in a band width direction in the cutting region A. This enable alternately performing an operation for causing the teeth 31 to bite into the workpiece W as shown in FIGS. 16(a) and 16(b) and an operation for causing the teeth 31 to scrape away chips Wa as shown in FIGS. 16(c) and 2(d) at short intervals.

In this case, the immersion amount of the backup roller 29 with respect to the notch 41 when the backup roller 29 is engaged with the notch 41 is the amplitude S of the vibration of the band saw blade 23xiv, and the amplitude S is equal to or higher than 0.1 mm and equal to or lower than 0.5 mm. The reason is as follows. If the amplitude of the vibration of the band saw blade 23xiv is lower than 0.1 mm, the cutting resistance of the workpiece W cannot be made sufficiently low. If the amplitude of the vibration of the band saw blade 23xiv is higher than 0.5 mm, the noise value (particularly the noise value measured with characteristic C) increases (which is already confirmed by conducting an experiment similar to the second experiment).

Moreover, the frequency Z (Z=(1000V/60)/P) of the vibration of the band saw blade 23xiv specified by the length P (mm) of the notch 41 and the traveling speed V (m/min) of the band saw blade 23xiv is equal to or higher than 5 Hz. The reason is as follows. If the frequency of the vibration of the band saw blade 23xiv is lower than 5 Hz, the cutting resistance of the workpiece W cannot be made sufficiently low (which is already confirmed by conducting an experiment similar to the third experiment).

As stated so far, according to the fourteenth example, the operation for causing the teeth 31 to bite into the workpiece W and the operation for causing the teeth 31 to scrape away the chips Wa can be alternately performed at short intervals in the cutting region A. It is, therefore, possible to reduce the cutting length of the band saw blade 23xiv and reduce the cutting resistance of the workpiece W irrespectively of the magnitude of the workpiece W. Due to this, the cutting course deviation of the band saw blade 23xiv is suppressed, the service life of the band saw blade 23xiv is prolonged, the cutting noise is abated, and the work environment is improved.

Figure 17:
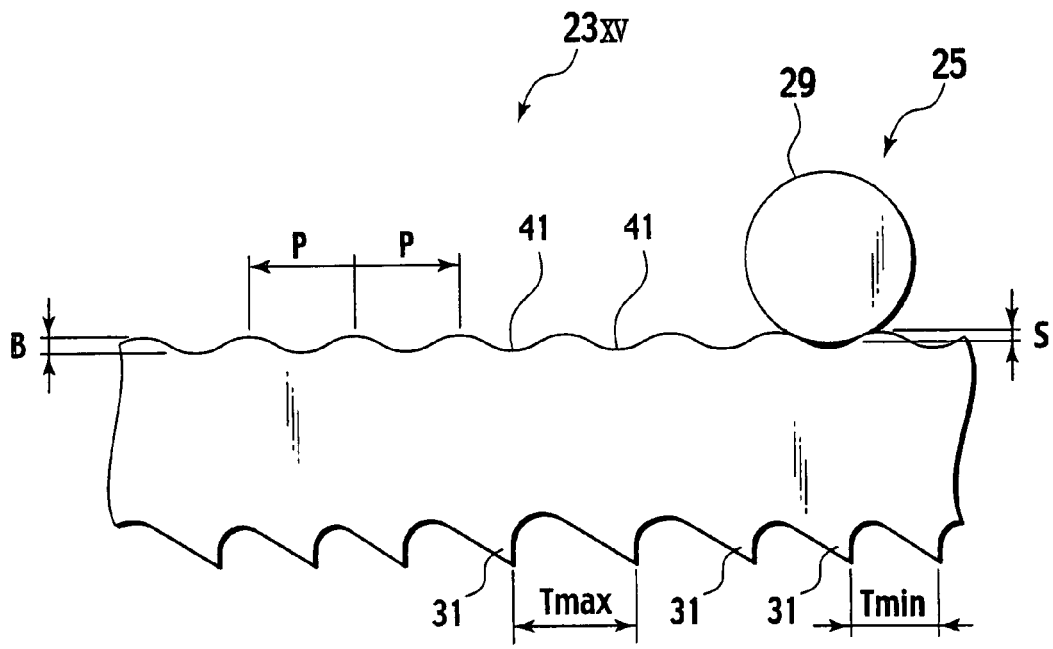
FIGS. 17(a) and 17(b) show a band saw blade according to a fifteenth example of the embodiment.
Figure 17:
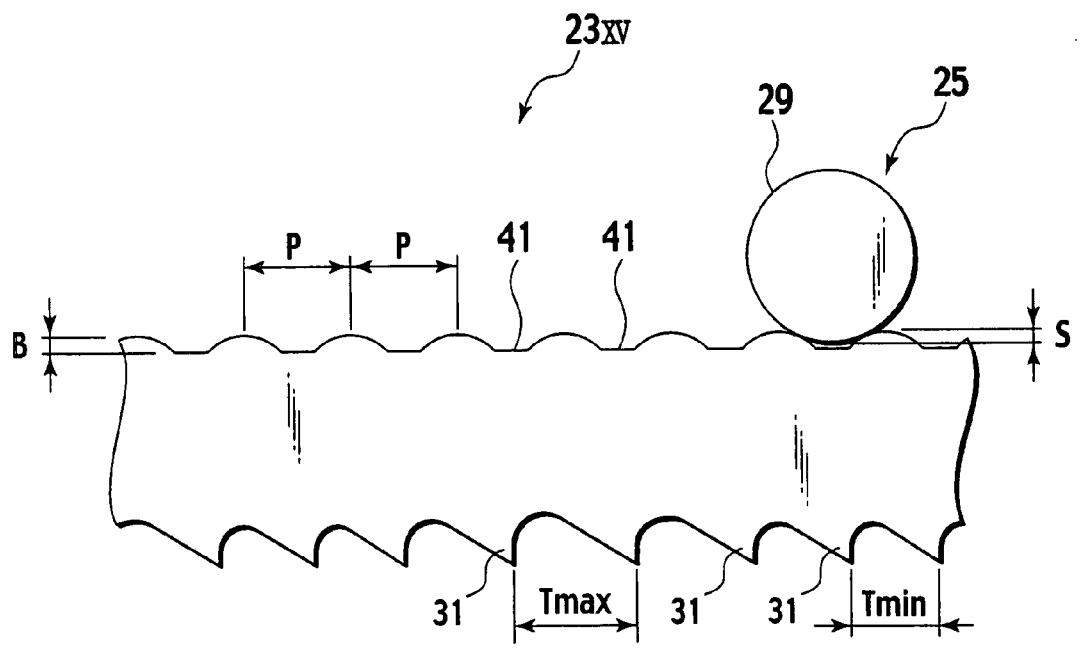

A band saw blade according to a fifteenth example of the embodiment will be briefly described with reference to FIGS. 17(a) and 17(b). FIGS. 17(a) and 17(b) show the band saw blade according to the fifteenth example of the embodiment. As shown in FIGS. 17(a) and 17(b), a band saw blade 23xv according to the fifteenth example is configured almost identical to the band saw blade 23xiv according to the fourteenth example, and hence differences of a configuration of the band saw blade 23xv from that of the band saw blade 23xiv will only be described.

Namely, in the band saw blade 23xiv according to the fourteenth example, the notches 41 are triangular and shoulders of the notches 41 are formed to be angular. In the band saw blade 23xv according to the fifteenth example, by contrast, the notches 41 are corrugated and the shoulders of the notches 41 are formed into an R shape.

Even if the band saw blade 23xv according to the fifteenth example is employed, a cutting method similar to that according to the fourteenth example can be used. The fifteenth example exhibits the same functions and advantages as those of the fourteenth example.

Figure 18:
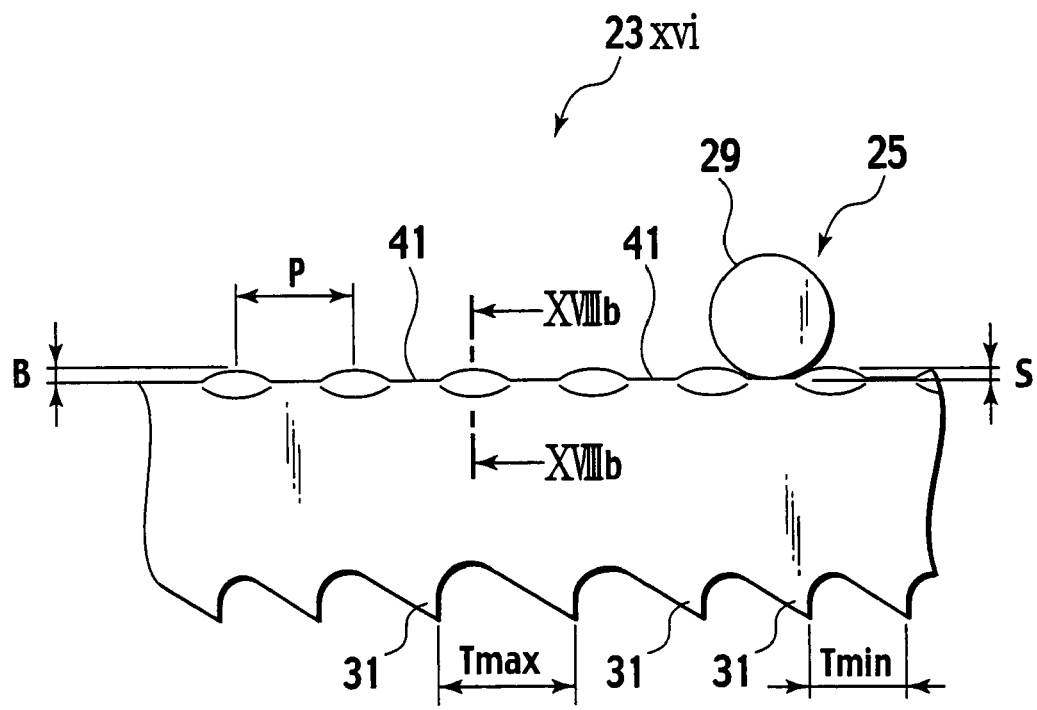
FIG. 18(a) shows a band saw blade according to a sixteenth example of the embodiment.
FIG. 18(b) is a diagram taken along a line XVIIb-XVIIb shown in FIG. 18(a)
Figure 18:
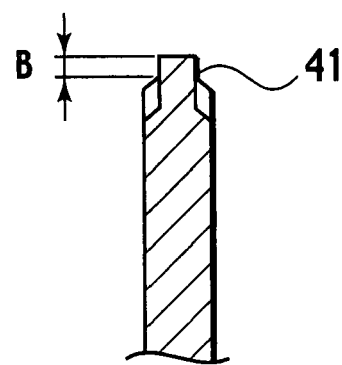

A band saw blade according to a sixteenth example of the embodiment will be described with reference to FIGS. 18(a) and 18(b). FIG. 18(a) shows the band saw blade according to the thirteenth example of the embodiment, and FIG. 18(b) is a diagram taken along a line XVIIb-XVIIb shown in FIG. 18(a). As shown in FIGS. 18(a) and 18(b), a band saw blade 23xvi according to the sixteenth example is configured almost identical to the band saw blade 23xiv according to the fourteenth example, and hence differences of a configuration of the band saw blade 23xvi from that of the band saw blade 23xiv will only be described.

Namely, the band saw blade 23xvi according to the fourteenth example is configured so that a gap is formed between the backup roller 29 and the bottom of the notch 41 when the backup roller 29 is engaged with the notch 41. The band saw blade 23xvi according to the sixteenth example is, by contrast, configured so that the backup roller 29 contacts with the bottom of the notch 41 when the backup roller 29 is engaged with the notch 41. By so configuring, the number of contact portions of the band saw blade 23xvi with the backup roller 29 increases, and the backup roller 29 can receive a cutting thrust force in a dispersed manner.

Moreover, each notch 41 is formed by cutting or grinding in the band saw blade 23xiv according to the fourteenth example whereas each notch 41 is formed by rolling in the band saw blade 23xvi according to the sixteenth example.

Even if the band saw blade 23xvi according to the sixteenth example is employed, a cutting method similar to that according to the fourteenth example can be used. The sixteenth example exhibits the same functions and advantages as those of the fourteenth example. In this case, the immersion amount of the backup roller 29 with respect to the notch 41 when the backup roller 29 is engaged with the notch 41 is equal to the depth B of the notch 41, and the depth B of the notch 41 is the amplitude S of the vibration of the band saw blade 23xvi.

The embodiment of the present invention described above is to be considered not restrictive, and the invention can be embodied in other various forms, as changes are appropriately made.

Note that the disclosures of Japanese Patent Application No. 2004-239864 (filed on Aug. 19, 2004) and Japanese Patent Application No. 2005-205905 (filed on Jul. 14, 2005) are incorporated by reference herein in their entirety.

The invention claimed is:

1. A band saw blade comprising:
a back which is straightly elongated in a longitudinal direction of the band saw blade;
a plurality of teeth; and
a plurality of recesses that are consecutively formed on the back of the band saw blade,
wherein tips of all of the teeth are aligned in one straight line parallel to the back of the band saw blade;
each of the recesses is configured to be engageable with and disengageable from a backup roller, so that vibration in a band width direction of the band saw blade is generated when the recesses engage with and disengage from the backup roller;
a pitch of the recesses is equal to or smaller than four times a maximum pitch of a tooth top of the teeth;
the pitch of the recesses is equal to or larger than a minimum pitch of the tooth top of the teeth;
an amplitude of the vibration in the band width direction of the band saw blade is equal to or higher than 0.1 mm and equal to or lower than 0.5 mm;
the length of each of the recesses is smaller than a diameter of the backup roller so as to form a gap between the backup roller and a bottom of each of the recesses, so that the backup roller does not contact the bottoms of the recesses when the recesses are engaged with the backup roller; and
a frequency of the vibration of the band saw blade, which is a function of the pitch of the recesses and a traveling speed of the band saw blade in a longitudinal direction of the band saw blade, is equal to or greater than 5 Hz,
whereby the plurality of teeth rapidly bite into a workpiece simultaneously in a manner such that the band saw blade approaches the workpiece in a parallel manner when the recesses disengage from the backup roller, and then the plurality of teeth move away from the workpiece simultaneously in a manner such that the band saw blade moves away from the workpiece in a parallel manner when the recesses engage the backup roller so that the plurality of teeth scrape away chips which are cut off from the workpiece.

2. The band saw blade according to claim 1, wherein the pitch of the recesses is equal to or smaller than three times the maximum pitch of the tooth top of the teeth.

3. The band saw blade according to claim 1, wherein each of the recesses are classified into a plurality of types according to the length of each of the recesses.

4. The band saw blade according to claim 1, wherein the recesses are classified into a plurality of types according to a length of each of the recesses.

5. The band saw blade according to claim 1, wherein the recesses are classified into a plurality of types according to a depth of each of the recesses.

6. A band saw machine, comprising:
a backup guide including a backup roller; and
a band saw blade which is supported by the backup roller,
wherein the band saw blade comprises:
a back which is straightly elongated in a longitudinal direction of the band saw blade;
a plurality of teeth; and
a plurality of recesses that are consecutively formed on the back of the band saw blade,
wherein tips of all of the teeth are aligned in one straight line parallel to the back of the band saw blade;
each of the recesses is configured to be engageable with and disengageable from the backup roller, so that vibration in a band width direction of the band saw blade is generated when the recesses engage with and disengage from the backup roller;
a pitch of the recesses is equal to or smaller than four times a maximum pitch of a tooth top of the teeth;
the pitch of the recesses is equal to or larger than a minimum pitch of the tooth top of the teeth;
an amplitude of the vibration in the band width direction of the band saw blade is equal to or higher than 0.1 mm and equal to or lower than 0.5 mm;
the length of each of the recesses is smaller than a diameter of the backup roller so as to form a gap between the backup roller and a bottom of each of the recesses, so that the backup roller does not contact the bottoms of the recesses when the recesses are engaged with the backup roller; and
a frequency of the vibration of the band saw blade, which is a function of the pitch of the recesses and a traveling speed of the band saw blade in a longitudinal direction of the band saw blade, is equal to or greater than 5 Hz,
whereby the plurality of teeth rapidly bite into a workpiece simultaneously in a manner such that the band saw blade approaches the workpiece in a parallel manner when the recesses disengage from the backup roller, and then the plurality of teeth move away from the workpiece simultaneously in a manner such that the band saw blade moves away from the workpiece in a parallel manner when the recesses engage the backup roller so that the plurality of teeth scrape away chips which are cut off from the workpiece.

* * * * *